(12) United States Patent
Takayama et al.

(10) Patent No.: US 11,322,841 B2
(45) Date of Patent: May 3, 2022

(54) ANTENNA MODULE AND COMMUNICATION DEVICE EQUIPPED WITH THE SAME

(71) Applicant: Murata Manufacturing Co., Ltd., Kyoto (JP)

(72) Inventors: Keisei Takayama, Kyoto (JP); Yoshiki Yamada, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/103,069

(22) Filed: Nov. 24, 2020

(65) Prior Publication Data

US 2021/0083380 A1    Mar. 18, 2021

Related U.S. Application Data

(63) Continuation of application No. PCT/JP2020/019611, filed on May 18, 2020.

(30) Foreign Application Priority Data

Jun. 28, 2019    (JP) .............................. JP2019-120910

(51) Int. Cl.
*H01Q 1/38*        (2006.01)
*H01Q 5/28*        (2015.01)
(Continued)

(52) U.S. Cl.
CPC .............. *H01Q 5/28* (2015.01); *H01Q 5/328* (2015.01); *H01Q 9/0407* (2013.01); *H04B 1/0483* (2013.01)

(58) Field of Classification Search
CPC ........ H01Q 5/28; H01Q 5/328; H01Q 9/0407; H01Q 1/48; H04B 1/0483
See application file for complete search history.

(56) References Cited

U.S. PATENT DOCUMENTS 3,984,834 A * 10/1976 Kaloi ................... H01Q 9/0407
                                                       343/700 MS
4,401,988 A *  8/1983 Kaloi ................... H01Q 19/005
                                                       343/700 MS
(Continued)

FOREIGN PATENT DOCUMENTS

EP       3 065 219 A1    9/2016
JP       2002-026634 A   1/2002
(Continued)

OTHER PUBLICATIONS

International Search Report for PCT/JP2020/019611 dated Aug. 4, 2020.
Written Opinion for PCT/JP2020/019611 dated Aug. 4, 2020.

*Primary Examiner* — Dieu Hien T Duong
(74) *Attorney, Agent, or Firm* — Pearne & Gordon LLP

(57) ABSTRACT

An antenna module includes a power supply element and a ground electrode (GND) arranged so as to face the power supply element. In a plan view of the antenna module from a normal direction, when a minimum distance along the first direction between a center of the power supply element and an end portion of the ground electrode (GND) is defined as a first distance, a minimum distance between the center of the power supply element and an end portion of the ground electrode (GND) is defined as a second distance, and a distance between the end portion of the ground electrode (GND) and an end portion of the power supply element in the second distance is defined as a third distance, the first distance is longer than the second distance, and the third distance is shorter than ½ of a size of the power supply element.

14 Claims, 18 Drawing Sheets

(51) Int. Cl.
     *H01Q 5/328*     (2015.01)
     *H01Q 9/04*      (2006.01)
     *H04B 1/04*      (2006.01)

(56) References Cited

U.S. PATENT DOCUMENTS

| | | | | |
|---|---|---|---|---|
| 5,771,025 | A | * | 6/1998 | Reece ................ H01Q 1/38 343/789 |
| 2017/0222316 | A1 | | 8/2017 | Mizunuma et al. |
| 2019/0103653 | A1 | * | 4/2019 | Jeong ................ H01L 25/0655 |
| 2019/0386393 | A1 | * | 12/2019 | Chiang ................ H01Q 25/001 |
| 2020/0395679 | A1 | * | 12/2020 | Lim ................ H01Q 21/065 |

FOREIGN PATENT DOCUMENTS

| | | | |
|---|---|---|---|
| JP | 2008-061030 | A | 3/2008 |
| JP | 2015-056810 | A | 3/2015 |
| JP | 2019-004241 | A | 1/2019 |
| WO | 2016/063759 | A1 | 4/2016 |

* cited by examiner

FIG. 4

| ANTENNA CONFIGURATION | EMBODIMENT 1 | COMPARATIVE EXAMPLE | REFERENCE (SQUARE SUBSTRATE) |
|---|---|---|---|
| BAND WIDTH (RL<10dB) | 1.51GHz | 1.36GHz | 1.98GHz |

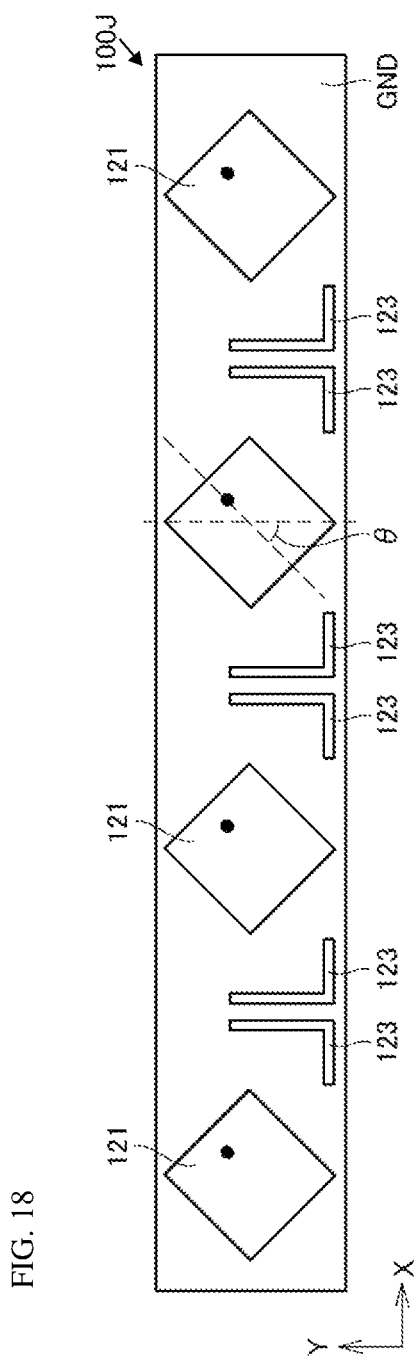

ANTENNA MODULE AND COMMUNICATION DEVICE EQUIPPED WITH THE SAME

CROSS REFERENCE TO RELATED APPLICATION

This is a continuation of International Application No. PCT/JP2020/019611 filed on May 18, 2020 which claims priority from Japanese Patent Application No. 2019-120910 filed on Jun. 28, 2019. The contents of these applications are incorporated herein by reference in their entireties.

BACKGROUND

Technical Field

The present disclosure relates to an antenna module and a communication device equipped with the antenna module, and more particularly, relates to, in an antenna module having a radiation element which has a flat plate shape, arrangement of the radiation element.

International Publication No. 2016/063759 (Patent Document 1) discloses an antenna module in which a patch antenna (radiation element) having a flat plate shape is arranged on one surface of a dielectric substrate having a rectangular shape, and a radio frequency semiconductor element is arranged on the other surface of the dielectric substrate.

Patent Document 1: International Publication No. 2016/063759

BRIEF SUMMARY

The antenna module disclosed in International Publication No. 2016/063759 (Patent Document 1) may be used as an antenna of a mobile terminal, such as a smartphone, for example. In an antenna module using such a patch antenna, radio waves are radiated from a radiation element by electromagnetic field coupling between the radiation element and a ground electrode arranged so as to face the radiation element.

In an ideal patch antenna, it is assumed that the ground electrode has an infinite size with respect to the radiation element. However, in practice, since the ground electrode cannot be sufficiently large due to the constraint of a substrate size, the antenna characteristics may be deteriorated in general as compared with the ideal case.

Mobile terminals are required to be further downsized and thinned, so that antenna modules to be used for the mobile terminals are also required to be further downsized. When a size of a dielectric substrate is limited by the reduction in size of the antenna module, an area of the ground electrode included in the substrate is also limited. Therefore, there is a concern that the electromagnetic field coupling between the radiation element and the ground electrode cannot be sufficiently secured, and the antenna characteristics deteriorate.

The present disclosure suppresses degradation in antenna characteristics in a case where an area of a ground electrode is limited in an antenna module using a patch antenna.

An antenna module according to an aspect of the present disclosure includes a first radiation element capable of radiating a radio wave with a first direction set as a polarization direction, and a first ground electrode arranged so as to face the first radiation element. In a plan view of the first radiation element from a normal direction, when a minimum distance along the first direction between a center of the first radiation element and an end portion of the first ground electrode is defined as a first distance, a minimum distance between the center of the first radiation element and an end portion of the first ground electrode is defined as a second distance, and a distance between the end portion of the first ground electrode and an end portion of the first radiation element in the second distance is defined as a third distance, the first distance is longer than the second distance, and the third distance is shorter than ½ of a size of the first radiation element.

In the antenna module according to the present disclosure, in a plan view of the antenna module, when the minimum distance along the first direction between the center of the radiation element and the end portion of the ground electrode is defined as the first distance, the minimum distance between the center of the radiation element and the end portion of the ground electrode is defined as the second distance, and the distance between the end portion of the ground electrode and the end portion of the radiation element of the second distance is defined as the third distance, the radiation element is arranged with respect to the ground electrode such that the first distance is longer than the second distance, and the third distance is shorter than ½ of the size of the radiation element. This makes it possible to ensure a distance between the radiation element and the end portion of the ground electrode in a plan view of the antenna module in both the polarization direction and a direction orthogonal to the polarization direction to some extent. Therefore, in the antenna module using the patch antenna, in a case where an area of the ground electrode is limited, it is possible to suppress a degradation in antenna characteristics.

BRIEF DESCRIPTION OF THE SEVERAL VIEWS OF THE DRAWINGS

FIG. 4 is a diagram for describing frequency band widths in Embodiment 1 and a comparative example.

FIG. 18 is a plan perspective view of an antenna module according to Modification 7.

DESCRIPTION OF EMBODIMENTS

Figure 1:
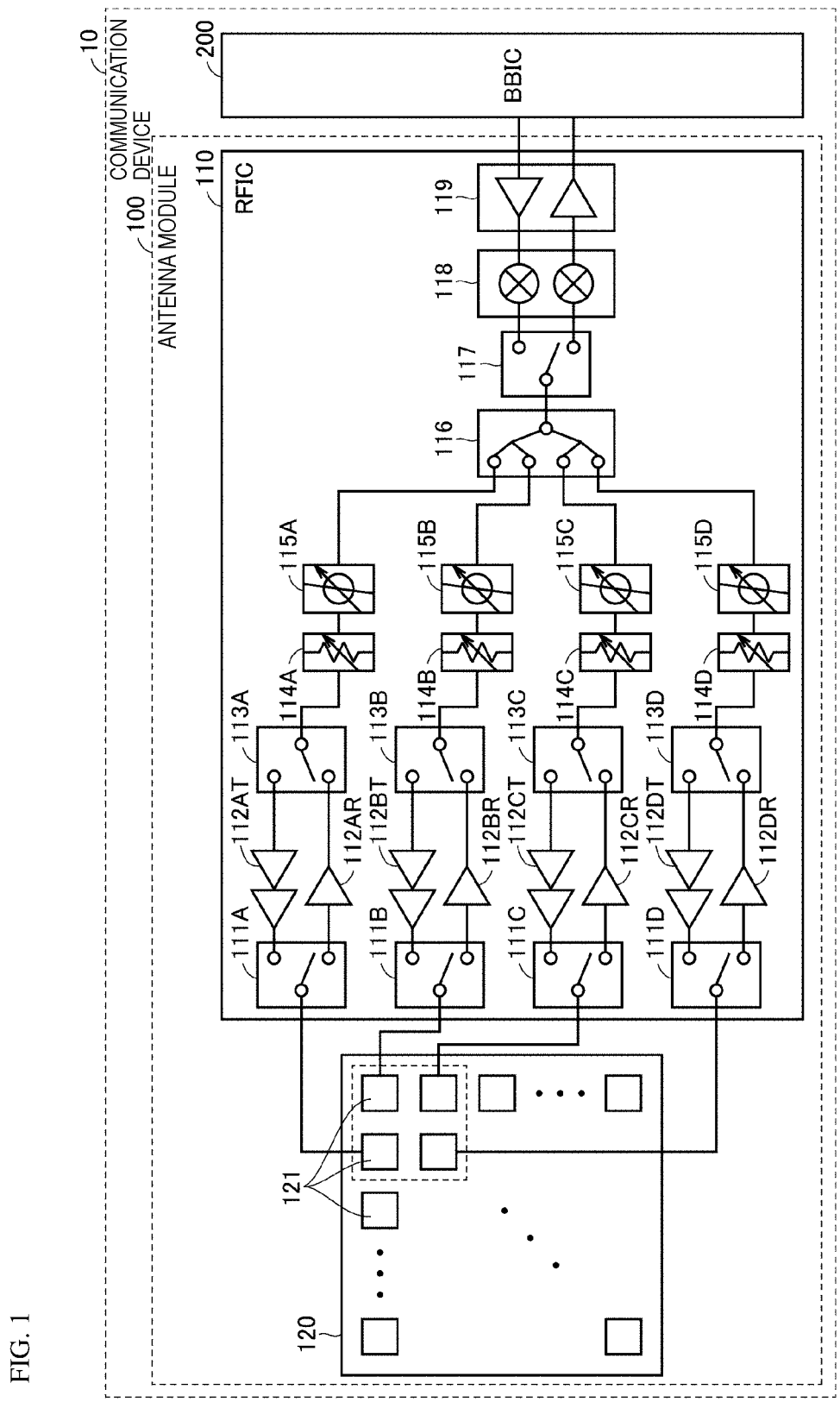
FIG. 1 is a block diagram of a communication device to which an antenna module according to Embodiment 1 is applied.

Hereinafter, embodiments of the present disclosure will be described in detail with reference to the accompanying drawings. Note that the same or corresponding parts in the drawings are denoted by the same reference signs, and the description thereof will not be repeated.

Embodiment 1

(Basic Configuration of Communication Device)

FIG. 1 is an example of a block diagram of a communication device 10 to which an antenna module 100 according to Embodiment 1 is applied. The communication device 10 is, for example, a mobile terminal, such as a mobile phone, a smartphone, a tablet or the like, a personal computer having a communication function, or the like. Examples of a frequency band of radio waves to be used in the antenna module 100 according to the present embodiment include radio waves in a millimeter wave band having, for example, 28 GHz, 39 GHz, or 60 GHz as a center frequency, but radio waves in a frequency band other than the frequency bands described above are also applicable.

Referring to FIG. 1, the communication device 10 includes the antenna module 100 and a BBIC 200 that configures a baseband signal processing circuit. The antenna module 100 includes an RFIC 110, which is an example of a power supply circuit, and an antenna device 120. The communication device 10 up-converts a signal transmitted from the BBIC 200 to the antenna module 100 into a radio frequency signal to radiate the radio frequency signal from the antenna device 120, and down-converts a radio frequency signal received by the antenna device 120 to process the down-converted signal in the BBIC 200.

In FIG. 1, for ease of description, only a configuration corresponding to four power supply elements 121 among a plurality of power supply elements 121 (radiation elements) configuring the antenna device 120 is illustrated, and configurations corresponding to the other power supply elements 121 having a similar configuration are omitted. Note that FIG. 1 illustrates an example in which the antenna device 120 is formed of the plurality of power supply elements 121 arranged in a two-dimensional array, but the number of the power supply elements 121 is not necessarily plural, and the antenna device 120 may be formed of a single power supply element 121. In addition, the plurality of power supply elements 121 may be arranged in a row as a one-dimensional array. In the present embodiment, the power supply element 121 is a patch antenna having a substantially square flat plate shape.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal multiplexer/demultiplexer 116, a mixer 118, and an amplification circuit 119.

When a radio frequency signal is transmitted, the switches 111A to 111D and 113A to 113D are switched to sides of the power amplifiers 112AT to 112DT, and the switch 117 is connected to a transmission-side amplifier of the amplification circuit 119. When a radio frequency signal is received, the switches 111A to 111D and 113A to 113D are switched to sides of the low-noise amplifiers 112AR to 112DR, and the switch 117 is connected to a reception-side amplifier of the amplification circuit 119.

A signal transmitted from the BBIC 200 is amplified by the amplification circuit 119, and is up-converted by the mixer 118. A transmission signal which is the up-converted radio frequency signal is demultiplexed into four signals by the signal multiplexer/demultiplexer 116, and the four demultiplexed signals pass through four signal paths, and are individually supplied to the different power supply elements 121. At this time, directivity of the antenna device 120 can be adjusted by individually adjusting phase shift degrees of the phase shifters 115A to 115D arranged in the respective signal paths.

Reception signals which are radio frequency signals received by the respective power supply elements 121 individually pass through the four different signal paths, and are multiplexed by the signal multiplexer/demultiplexer 116. The multiplexed reception signal is down-converted by the mixer 118, amplified by the amplification circuit 119, and transmitted to the BBIC 200.

The RFIC 110 is formed as, for example, a one-chip integrated circuit component including the above-described circuit configuration. Alternatively, the devices (switches, power amplifiers, low-noise amplifiers, attenuators, and phase shifters) corresponding to each of the power supply elements 121 in the RFIC 110 may be formed as one-chip integrated circuit for each of the corresponding power supply elements 121.

(Configuration of Antenna Module)

Figure 2A:
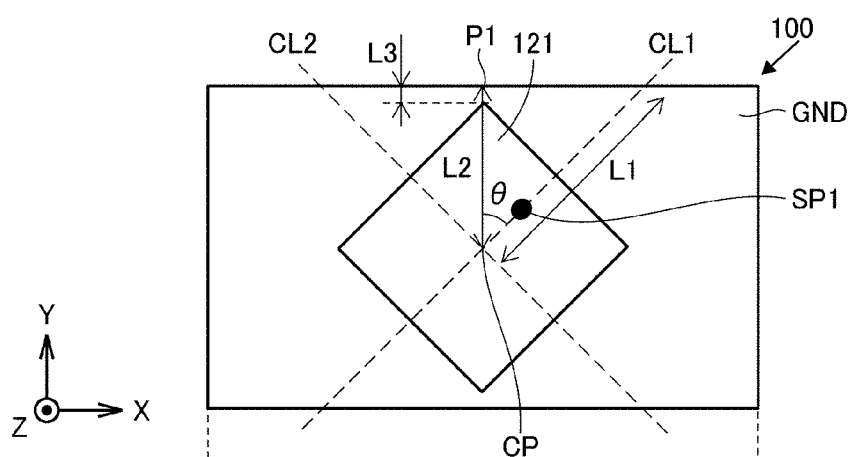
FIGS. 2A and 2B are diagrams illustrating the antenna module according to Embodiment 1.
Figure 2B:
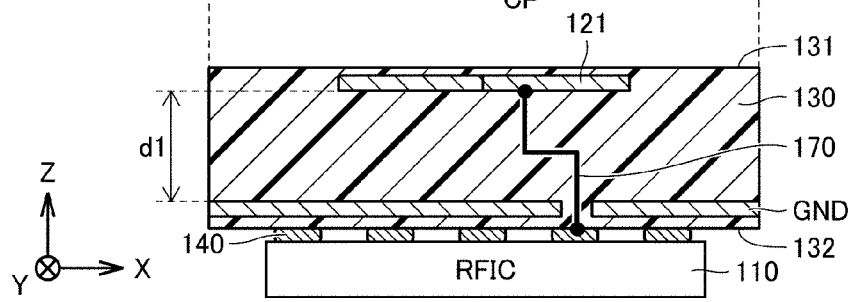

Next, the configuration of the antenna module 100 according to Embodiment 1 will be described in detail with reference to FIGS. 2A and 2B. In FIGS. 2A and 2B, the diagram in the upper row (FIG. 2A) is a plan perspective view of the antenna module 100, and the diagram in the lower row (FIG. 2B) is a cross-sectional perspective view of the antenna module.

In FIGS. 2A and 2B, for ease of description, a case where the antenna module 100 has one power supply element 121 as a radiation element is illustrated as an example, but as will be described later, the number of power supply elements may be equal to or more than two, and the power supply elements may be two-dimensionally arrayed. The antenna module 100 includes a dielectric substrate 130, a power supply wiring 170, and a ground electrode GND in addition to the power supply element 121 and the RFIC 110. Note that, in the following description, a normal direction (radiation direction of radio waves) of the dielectric substrate 130 is defined as a Z-axis direction, and a plane perpendicular to the Z-axis direction is defined by using an X-axis and a Y-axis. In addition, a positive direction of the Z-axis in each drawing may be referred to as an upper side, and a negative direction may be referred to as a lower side in some cases.

The dielectric substrate 130 is, for example, a low-temperature co-fired ceramic (low temperature co-fired ceramics (LTCC)) multilayer substrate, a multilayer resin substrate formed by laminating a plurality of resin layers formed by laminating a plurality of resin layers formed of resin, such as epoxy, polyimide or the like, a multilayer resin substrate formed by laminating a plurality of resin layers formed of liquid crystal polymer (LCP) having a lower dielectric constant, a multilayer resin substrate formed by laminating a plurality of resin layers formed of fluororesin, or a ceramic multilayer substrate other than LTCC. Note that the dielectric substrate 130 may not necessarily be multi-layer structure, and may be a single-layer substrate. Note that, in FIG. 2A and the plan perspective views to be described later, the dielectric substrate 130 and the power supply wiring are omitted.

The dielectric substrate 130 has a substantially rectangular shape, and the power supply element 121 is arranged on an upper surface 131 (a surface in the positive direction of the Z-axis) or in an internal layer of the dielectric substrate 130. The power supply element 121 is a patch antenna having a substantially square planar shape. The power supply element 121 is arranged such that each side of the power supply element 121 is arranged so as to be inclined by a predetermined angle with respect to a long side and a short side (i.e., the X-axis and the Y-axis in the figure) of the dielectric substrate 130. In the example of FIGS. 2A and 2B, the predetermined angle is approximately 45°.

In the dielectric substrate 130, the ground electrode GND having a flat plate shape is arranged so as to face the power supply element 121 in a layer on a lower surface 132 (a surface in the negative direction of the Z-axis) side relative to the power supply element 121. The RFIC 110 is mounted on the lower surface 132 of the dielectric substrate 130 through solder bumps 140. Note that, instead of the solder connection, the RFIC 110 may be connected to the dielectric substrate 130 by using a multipolar connector.

A radio frequency signal is supplied from the RFIC 110 to a power supply point SP1 of the power supply element 121 through the power supply wiring 170. In the example of FIGS. 2A and 2B, the power supply point SP1 passes through a center (intersection point of diagonal lines) CP of the power supply element 121, and is arranged at a position offset in a direction (first direction) of a dashed line CL1 parallel to the sides of the power supply element 121. By arranging the power supply point SP1 at such a position, radio waves are radiated with the above-described first direction set as the polarization direction.

The power supply wiring 170 is formed of a wiring pattern formed between the layers of the dielectric substrate 130 and a via penetrating through the layers. Note that, in the antenna module 100, conductors configuring the radiation element, the wiring pattern, the electrode, the via, and the like are made of metal having aluminum (Al), copper (Cu), gold (Au), silver (Ag), and alloy thereof as a main component.

The power supply element 121 is arranged such that each side of the power supply element 121 is arranged so as to be inclined with respect to each side of the ground electrode GND having a rectangular shape. That is, the power supply element 121 is arranged such that an angle θ formed between the polarization direction (the first direction) and a direction connecting a position P1 of an end portion of the ground electrode GND with a minimum distance from the center CP of the power supply element 121 and the center CP of the power supply element 121 in a plan view of the antenna module 100 satisfies 0°<θ<90°.

Further, when this is expressed by using a distance between the ground electrode GND and the power supply element 121, in a plan view of the antenna module 100, a minimum distance along the first direction between the center CP of the power supply element 121 and an end portion of the ground electrode GND is defined as a distance L1 (first distance), and a minimum distance between the center CP of the power supply element 121 and an end portion of the ground electrode GND is defined as a distance L2 (second distance), the distance L1 is longer than the distance L2 (L1>L2). Further, when a minimum distance between an end portion of the power supply element 121 and the end portion of the ground electrode GND in the distance L2 is defined as a distance L3 (third distance), the distance L3 is shorter than ½ of a size (a side length) of the power supply element 121.

In the antenna module 100 according to Embodiment 1, the power supply element 121 is arranged so as to be inclined with respect to the ground electrode GND, thereby suppressing deterioration in antenna characteristics. Hereinafter, a mechanism by which the deterioration in antenna characteristics can be suppressed due to such arrangement of the power supply element 121 will be described with reference to FIGS. 3A and 3B.

Figures 3A, 3B:
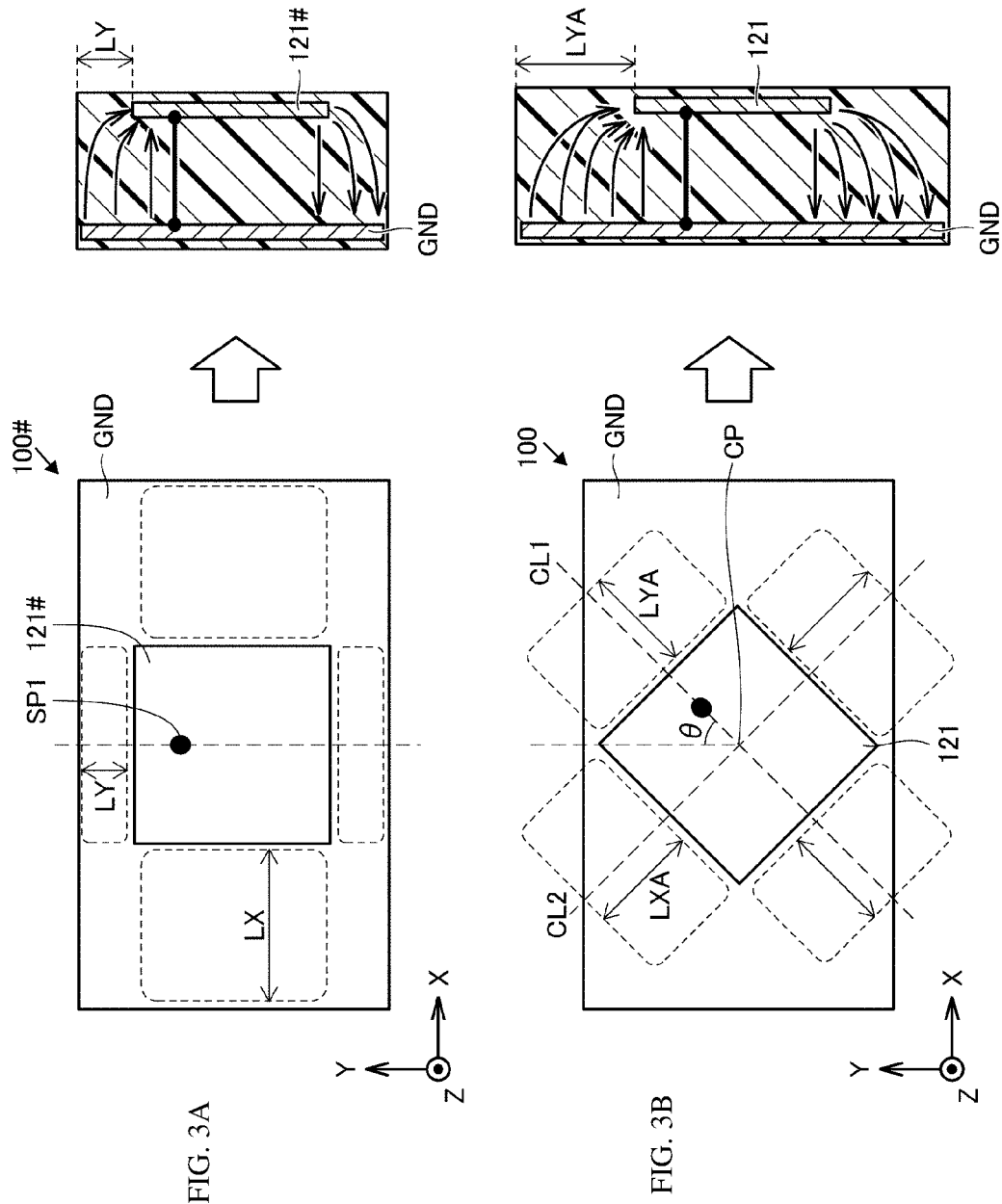
FIGS. 3A and 3B are diagrams for schematically describing a mechanism by which antenna characteristics are improved in Embodiment 1.

In FIGS. 3A and 3B, the diagram in the upper row (FIG. 3A) illustrates an antenna module 100 # according to a comparative example, and the diagram in the lower row (FIG. 3B) illustrates the antenna module 100 according to Embodiment 1. The diagrams on the right side in FIG. 3A and FIG. 3B illustrate electric lines of force between the ground electrode GND and the power supply element 121 in a cross section along the polarization direction.

In the antenna module 100 # according to the comparative example, a power supply element 121 # is arranged such that respective sides thereof are parallel to the X-axis and the Y-axis. In the comparative example, the power supply point SP1 is arranged at a position offset from a center of the power supply element 121 # in the positive direction of the Y-axis, and radio waves are radiated from the power supply element 121 # with the Y-axis direction set as the polarization direction.

In the power supply element 121 #, the amplitude of a voltage becomes maximum at an end portion in the Y-axis direction, and therefore electric field intensity between the power supply element 121 # and the ground electrode GND also becomes maximum at the end portion. However, in a plan view of the antenna module 100 #, since a distance LY between the end portion of the power supply element 121 # in the polarization direction (Y-axis direction) and the end portion of the ground electrode GND is short, the amount of electric lines of force generated between the power supply element 121 # and the ground electrode GND is limited, and coupling between the power supply element 121 # and the ground electrode GND cannot be sufficiently secured. Accordingly, an electrostatic capacity of the power supply element 121 # with respect to the ground electrode GND cannot be sufficiently secured, and a frequency band width becomes narrow.

On the other hand, in the antenna module 100 according to Embodiment 1 in FIG. 3B, by arranging the power supply element 121 so as to be inclined with respect to the ground electrode GND, a distance LYA between an end portion of the power supply element 121 and the end portion of the ground electrode GND in the polarization direction (the direction of the line CL1: first direction) is longer than the distance LY in the comparative example, and coupling due to an electric field between the power supply element 121 and the ground electrode becomes stronger than that in the case of the comparative example. As a result, an electrostatic capacity of the power supply element 121 with respect to the ground electrode GND is also larger than that in the comparative example, and thus a frequency band width can be made wider than that in the case of the comparative example.

Further, it is known that a distance between an end portion of the power supply element and the end portion of the ground electrode GND in a direction orthogonal to the polarization direction affects a peak gain (directivity) of radio waves to be radiated, and the peak gain increases as the distance between the end portion of the power supply element and the end portion of the ground electrode GND increases. This is because coupling between the power supply element 121 and the ground electrode due to a magnetic field generated in the direction orthogonal to the polarization direction changes.

The distance between the end portion of the power supply element and the end portion of the ground electrode GND in the direction orthogonal to the polarization direction is maximum (a distance LX) in the comparative example, and gradually decreases as an inclination $\theta$ from the state of the comparative example increases. As described above, the distance between the end portion of the power supply element and the end portion of the ground electrode GND in the polarization direction becomes minimum at $\theta=0°$ and becomes maximum at $\theta=90°$, while the distance between the power supply element and the ground electrode GND in the direction orthogonal to the polarization direction becomes maximum at $\theta=0°$ and becomes minimum at $\theta=90°$. That is, the frequency band width and the peak gain have a trade-off relationship with respect to the inclination of the power supply element with respect to the ground electrode GND. Therefore, in Embodiment 1, the inclination $\theta$ of the power supply element with respect to the ground electrode GND is set so as to be in a range of $0°<\theta<90°$ in consideration of a desired frequency band width and a desired peak gain. In the example of FIGS. 2A and 2B and FIGS. 3A and 3B, $\theta=45°$ is set so that both the frequency band width and the peak gain are moderate. In this case, the distance LYA in the polarization direction between the power supply element 121 and the ground electrode GND is substantially the same as the distance LXA in the direction orthogonal to the polarization direction.

As described above, in Embodiment 1, in a case where the shapes (areas) of the dielectric substrate 130 and the ground electrode GND are limited, when the minimum distance between the power supply element 121 and the ground electrode GND is shorter than a predetermined distance, by arranging the power supply element 121 to be inclined with respect to the ground electrode GND as described above, extreme reduction in both frequency band width and peak gain is suppressed. Therefore, it is possible to suppress degradation in antenna characteristics when the area of the ground electrode is limited.

In particular, when a wave length of radio waves to be radiated from the power supply element 121 is represented by $\lambda$, in a case where the distance L3 illustrated in FIGS. 2A and 2B is shorter than $\lambda/4$, the amount of electric lines of force between the power supply element 121 and the ground electrode GND increases, and thus the effect of suppressing the degradation in antenna characteristics becomes large.

Further, when a wave length of radio waves on which an effective dielectric constant of the dielectric substrate is reflected is represented by $\lambda'$, in a case where the distance L3 is shorter than $\lambda'/4$, the amount of electric lines of force between the power supply element 121 and the ground electrode GND further increases, and therefore the effect of suppressing the degradation in antenna characteristics becomes larger.

Further, in a case where the distance L3 is shorter than twice a distance (thickness in the Z-direction) d1 in a laminating direction between the power supply element 121 and the ground electrode GND, the amount of electric lines of force between the power supply element 121 and the ground electrode GND further increases, and therefore the effect of suppressing the degradation in antenna characteristics becomes further larger.

Figure 5:
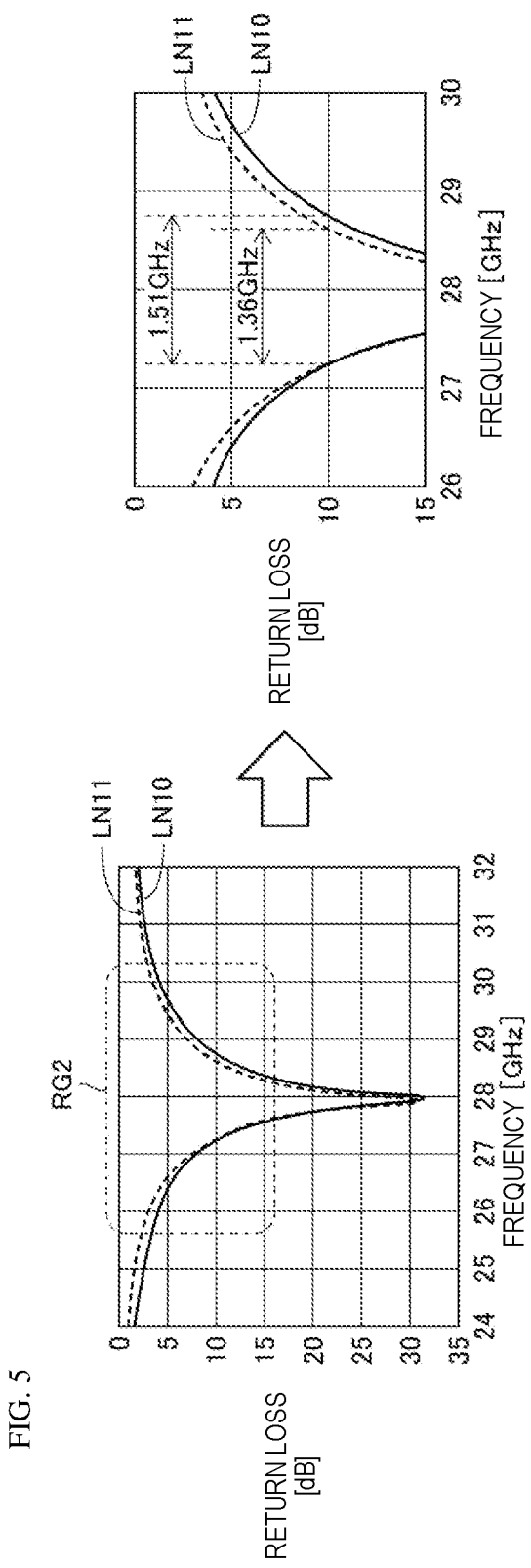
FIG. 5 is a diagram illustrating return losses in Embodiment 1 and the comparative example.
Figure 6:
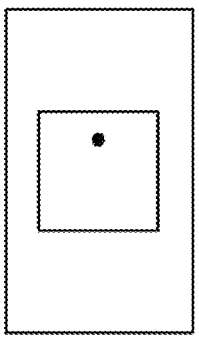
FIG. 6 is a diagram for describing effects of a shape of a ground electrode and arrangement of a radiation element on directivity.

Next, with reference to FIG. 4 to FIG. 6, comparison between the antenna characteristics of the antenna module 100 according to Embodiment 1 and the antenna characteristics of the antenna module according to the comparative example will be described.

FIG. 4 and FIG. 5 are diagrams for describing a simulation result related to frequency band widths in Embodiment 1 and the comparative example. In FIG. 4, for reference, a frequency band width in a case where the power supply element is arranged on a dielectric substrate having a substantially square shape and having a sufficiently large area of the ground electrode GND is also illustrated. Here, frequency band widths in which return losses of the power supply element are equal to or less than 10 dB are illustrated. In addition, FIG. 5 is a graph illustrating return losses in Embodiment 1 and the comparative example, and the right diagram in FIG. 5 is an enlarged view of a region RG2 of the graph in the left diagram. In FIG. 5, a solid line LN10 indicates the return loss in the case of Embodiment 1, and a dashed line LN11 indicates the return loss in the case of the comparative example.

Referring to FIG. 4 and FIG. 5, in the reference example in which the power supply element in which the Y-axis direction serves as the polarization direction is arranged on the dielectric substrate having the substantially square shape, the frequency band width is 1.98 GHz. From this state, when a dimension in the Y-axis direction (polarization direction) of the ground electrode is shortened as in the comparative example, the frequency band width is reduced to 1.36 GHz.

In Embodiment 1 in which the power supply element is inclined with respect to the ground electrode having the same shape as that of the comparative example, the return loss is reduced, and the frequency band width is improved to 1.51 GHz.

FIG. 6 is a diagram for describing the effects on directivity due to the shape of the dielectric substrate (ground electrode) and the arrangement of the power supply element. In FIG. 6, square substrates are illustrated in the left column and rectangular substrates are illustrated in the right column. In addition, cases of the comparative example in which a side of the dielectric substrate and a side of the power supply element are parallel to each other are illustrated in the upper row in FIG. 6, and cases of Embodiment 1 in which the power supply element is inclined with respect to the dielectric substrate are illustrated in the lower row. Note that, as described above, since the distance between the power supply element and the end portion of the ground electrode in the direction orthogonal to the polarization direction affects the directivity, in the comparative example in the upper row and right column, the dimension in the direction orthogonal to the polarization direction of the dielectric substrate is shortened.

Referring to FIG. 6, in the cases of the square substrate (left column), both of the directivities are 6.5 dBi and they are equivalent to each other even when the angles of the power supply elements are different from each other. This is considered because the distance between the end portion of the ground electrode and the power supply element is sufficiently large and ratios of the distance in the direction orthogonal to the polarization direction to the distance in the polarization direction are the same in both of the cases.

On the other hand, in the cases of the rectangular substrate in which one side of the ground electrode is shortened (right column), the directivity is 5.8 dBi in the comparative example, and the directivity is 6.3 dBi in Embodiment 1, which means Embodiment 1 is improved compared with the comparative example. In the case of the comparative example, the distance between the end portion of the ground electrode and the power supply element in the polarization direction is longer than that in the case of Embodiment 1 in the lower row, but the distance in the direction orthogonal to the polarization direction is shorter than that in Embodiment 1. That is, in the comparative example, the ratio of the distance in the direction orthogonal to the polarization direction to the distance in the polarization direction is smaller than that in the case of Embodiment 1.

As described above, the power supply element is arranged so as to be inclined with respect to the ground electrode as in Embodiment 1, and the ratio of the distance in the direction orthogonal to the polarization direction to the distance in the polarization direction is balanced, thereby causing the directivity to be improved.

As described above, in the antenna module using the power supply element having the flat plate shape, when the area of the ground electrode is limited, by arranging the power supply element with respect to the ground electrode such that an angle formed between the direction connecting the position of the end portion of the ground electrode having the minimum distance from the center of the power supply element and the center of the power supply element and the polarization direction of radio waves to be radiated becomes larger than 0° and smaller than 90°, the degradation in antenna characteristics (the frequency band width and the directivity) can be suppressed.

Modifications

Modifications of Embodiment 1 will be described with reference to FIG. 7 to FIG. 9.

(a) Modification 1

In Modification 1, an antenna module 100A where the power supply element 121 is arranged on an end portion side rather than the center of the ground electrode GND will be described. In the antenna module 100A, two distances between the power supply element 121 and the ground electrode GND in the polarization direction are different from each other. In this case, the antenna characteristics are limited because of the shorter distance.

Figure 7:
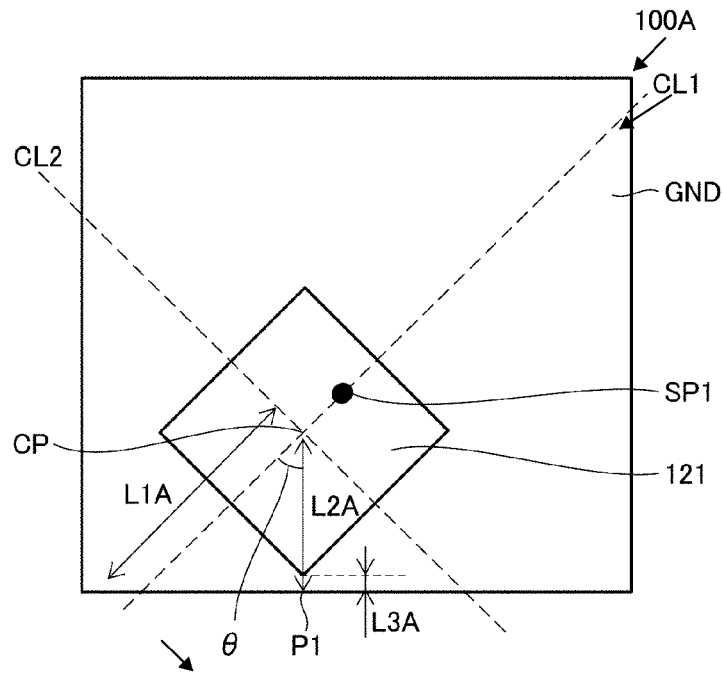
FIG. 7 is a diagram illustrating an antenna module according to Modification 1.
Figure 8:
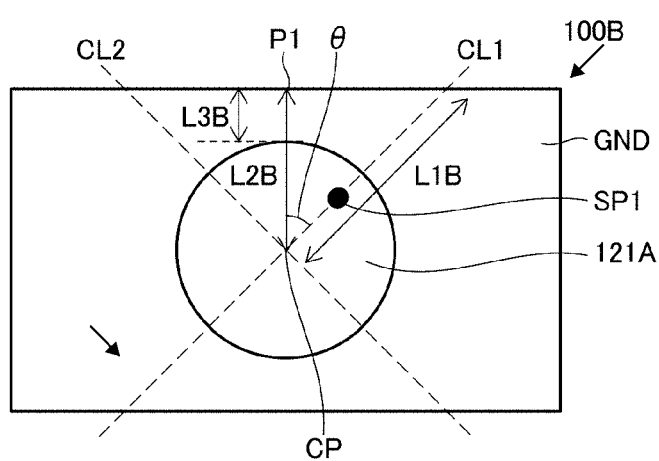
FIG. 8 is a diagram illustrating an antenna module according to Modification 2.

Also in the antenna module 100A, the power supply element 121 is arranged such that the angle θ formed between the direction connecting the center CP of the power supply element 121 and the position P1 of the end portion of the ground electrode GND and the polarization direction (the direction of the line CL1) in FIG. 7 satisfies 0°<θ<90°. As a result, it is possible to suppress the degradation in antenna characteristics (the frequency band width, and the directivity) in a similar manner to Embodiment 1.

Also, in Modification 1, in a plan view of the antenna module 100A, when a minimum distance between the center CP of the power supply element 121 and an end portion of the ground electrode GND in the polarization direction is defined as L1A (the first distance), and a minimum distance between the center CP of the power supply element 121 and an end portion of the ground electrode GND is defined as L2A (the second distance), L1A>L2A is satisfied. Further, when a distance between an end portion of the power supply element 121 and the end portion of the ground electrode GND in the distance L2A is defined as L3A (the third distance), the distance L3A is shorter than ½ of the side length of the power supply element 121.

(b) Modification 2

The shape of the antenna element is not limited to the substantially square shape as described above. In an antenna module 100B of Modification 2, a power supply element 121A having a circular shape is used as the radiation element. Even in a case of the power supply element 121A, when the area of the ground electrode GND is limited, it is possible to suppress the degradation in antenna characteristics (the frequency band width, and the directivity) by inclining the polarization direction of the power supply element 121A (0°<θ<90°) as in the above-described example.

Even in this case, in a plan view of the antenna module 100B, when a minimum distance between the center CP of the power supply element 121A and an end portion of the ground electrode GND in the polarization direction is defined as L1B (the first distance), and a minimum distance between the center CP of the power supply element 121 and an end portion of the ground electrode GND is defined as L2B (the second distance), L1B>L2B is satisfied. Further, when a distance between an end portion of the power supply element 121A and the end portion of the ground electrode GND of the distance L2B is defined as L3B (the third distance), the distance L3B is shorter than ½ of the side length of the power supply element 121A.

(c) Modification 3

In Modification 3, an antenna module 100C where parasitic elements 125 are arranged around the power supply element 121 as the radiation element will be described. In the antenna module 100C, the parasitic element 125 having a strip shape is arranged so as to face each side of the power supply element 121 having a substantially square shape. In this case, regarding a region including the entirety of the power supply element 121 and the parasitic elements 125 (a dashed region RG1), the power supply element 121 and the parasitic elements 125 are arranged such that the angle θ formed between the direction connecting the position of the end portion of the ground electrode GND having a minimum distance from the center of the power supply element 121 and the center of the power supply element 121 and the polarization direction satisfies 0°<θ<90°. By adopting such a configuration, it is possible to suppress the degradation in antenna characteristics (the frequency band width, and the directivity).

Note that, also in this case, in a plan view of the antenna module 100C, when a minimum distance between the center CP of the power supply element 121 and an end portion of the ground electrode GND in the polarization direction is defined as L1C (the first distance), and a minimum distance between the center CP of the power supply element 121 and an end portion of the ground electrode GND is defined as L2C (the second distance), L1C>L2C is satisfied. Further, when a distance between an end portion of the power supply element 121 and the end portion of the ground electrode GND in the distance L2C is defined as L3C (the third distance), the distance L3C is shorter than ½ of one side length of an outer edge of the region RG1.

Embodiment 2

In Embodiment 2, a configuration in which features of the present disclosure are applied to a so-called dual-polarization type antenna module capable of radiating two polarized waves whose polarization directions are different from each other will be described.

Figures 9, 10:
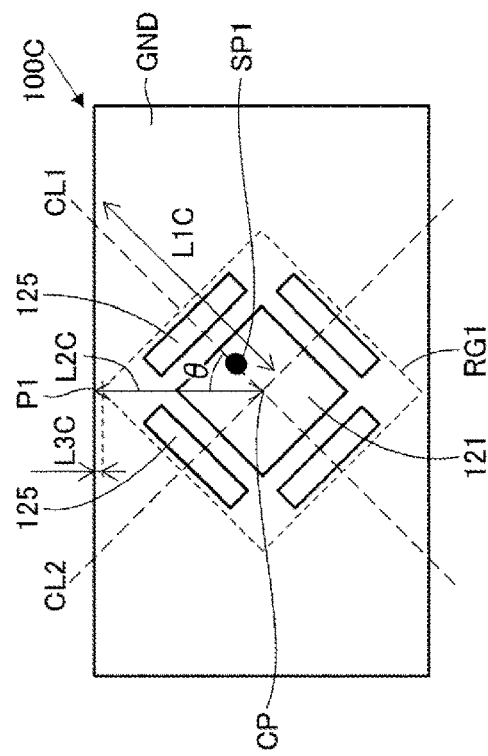
FIG. 9 is a diagram illustrating an antenna module according to Modification 3.
FIG. 10 is a diagram for describing frequency band widths of an antenna module according to Embodiment 2 and a comparative example.

FIG. 10 is a diagram for describing frequency band widths of an antenna module 100D according to Embodiment 2 and an antenna module 100 #1 according to the comparative example. Referring to FIG. 10, in both of the antenna module 100D and the antenna module 100 #1, a radio frequency signal is supplied to a power supply point SP2 in addition to the power supply point SP1 in the power supply element 121.

The polarization direction of radio waves radiated due to the radio frequency signal supplied to the power supply point SP1 and the polarization direction of radio waves radiated due to the radio frequency signal supplied to the power supply point SP2 are orthogonal to each other. More specifically, in the antenna module 100 #1 according to the comparative example, the power supply point SP1 is arranged at a position offset from the center of the power supply element 121 in a positive direction of a Y-axis. As a result, when the radio frequency signal is supplied to the power supply point SP1, radio waves whose polarization direction is a Y-axis direction are radiated from the power supply element 121. On the other hand, the power supply point SP2 is arranged at a position offset from the center of the power supply element 121 in the positive direction of an X-axis. Accordingly, when the radio frequency signal is supplied to the power supply point SP2, radio waves whose polarization direction is an X-axis direction are radiated from the power supply element 121.

The antenna module 100D according to Embodiment 2 has a configuration in which the power supply element 121 of the antenna module 100 #1 according to the comparative example is arranged so as to be inclined by 45° with respect to a ground electrode GND. Radio waves whose polarization direction is a direction (first direction) connecting the center of the power supply element 121 and the power supply point SP1 and radio waves whose polarization direction is a direction (second direction) connecting the center of the power supply element 121 and the power supply point SP2 are radiated from the antenna module 100D.

In a plan view of the antenna module 100D from a normal direction of the power supply element 121, when a minimum distance along the polarization direction in the first direction between the center of the power supply element 121 and an end portion of the ground electrode GND is defined as a first distance, a minimum distance between the center of the power supply element 121 and an end portion of the ground electrode GND is defined as a second distance, and a distance between the end portion of the ground electrode GND and an end portion of the power supply element 121 in the second distance is defined as a third distance, the first distance is longer than the second distance, and the third distance is shorter than ½ of the size of the power supply element 121.

Further, when a minimum distance along the polarization direction in the second direction between the center of the power supply element 121 and an end portion of the ground electrode GND is defined as a fourth distance, the fourth distance is longer than the second distance.

In the comparative example, as for polarized waves in the X-axis direction, since a distance between the power supply element 121 and an end portion of the ground electrode GND is long, the frequency band width in which a return loss is smaller than 10 dB is 2.34 GHz. On the other hand, as for polarized waves in the Y-axis direction, since a distance between the power supply element 121 and the end portion of the ground electrode GND is short, the frequency band width is 1.40 GHz.

On the other hand, in the antenna module 100D according to Embodiment 2, the frequency band widths of both of two polarized waves are 1.75 GHz. Although the frequency band is slightly narrower than that of the polarized wave in the X-axis direction of the comparative example, a difference between the frequency bands of the two polarized waves is small, and characteristics of the respective polarized waves are averaged.

In this way, also in the case of the dual-polarization type antenna module, when the area of the ground electrode is limited, an extreme degradation of the characteristics of one of both polarized waves can be suppressed by arranging the power supply element to be inclined with respect to the ground electrode.

Embodiment 3

In Embodiment 3, a configuration in which the features of the present disclosure are applied to an array antenna in which a plurality of power supply elements are arranged will be described.

Figure 11:
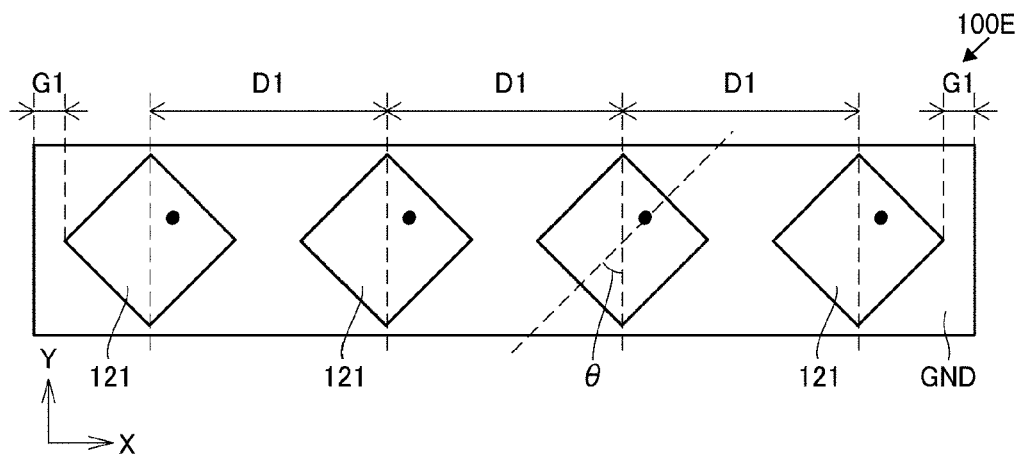
FIG. 11 is a plan perspective view of an antenna module according to Embodiment 3.

FIG. 11 is a plan perspective view of an antenna module 100E according to Embodiment 3. The antenna module 100E has a configuration in which four power supply elements 121 having a substantially square shape are arranged in a row along an X-axis direction so as to face a ground electrode GND having a rectangular shape. In addition, each of the power supply elements 121 is arranged such that polarization directions of radio waves radiated from the power supply elements 121 are inclined with respect to each side of the ground electrode GND.

That is, as for each power supply element 121, the power supply element 121 is arranged with respect to the ground electrode GND such that an angle θ formed between the direction connecting the position of an end portion of the ground electrode GND having a minimum distance from the center of the power supply element 121 and the center of the power supply element 121 and the polarization direction of radio waves radiated from the power supply element 121 satisfies 0°<θ<90°.

At this time, when a minimum distance between the center of the power supply element 121 and an end portion of the ground electrode GND in the polarization direction is defined as a first distance, and a minimum distance between the center of the power supply element 121 and the end portion of the ground electrode GND is defined as a second distance in a plan view of the antenna module 100E, the first distance is longer than the second distance. Further, when a distance between an end portion of the power supply element 121 and the end portion of the ground electrode GND in the second distance is defined as a third distance, the third distance is shorter than ½ of the size of the power supply element 121.

When the polarization direction of radio waves radiated from each power supply element 121 is the Y-axis direction, a region of the ground electrode GND for each power supply element 121 is limited in the Y-direction. In addition, when the polarization direction is the X-axis direction, regions of the ground electrode GND can be sufficiently secured for the central two power supply elements 121, but regions of the ground electrode GND are limited for the power supply elements 121 arranged on the end portions of the ground electrode.

On the other hand, in the antenna module 100E illustrated in FIG. 11, by arranging the power supply elements 121 to be inclined with respect to the ground electrode GND, the regions of the ground electrode GND can be secured for both the polarization direction and a direction orthogonal to the polarization direction. Therefore, it is possible to suppress degradations in antenna characteristics even in the power supply elements 121 on the end parts, and to suppress degradation in characteristics of the entire array antenna.

Here, it is suitable that a distance D1 between the adjacent power supply elements 121 be set to be wider than ½ of a wave length of radio waves to be radiated. Generally, in a case of an array antenna, a distance between adjacent radiation elements is set to ½ of a wave length of radio waves to be radiated from the radiation elements. However, as in the antenna module 100E of FIG. 11, by making a distance between adjacent elements wider than that in a general case, it is possible to enhance isolation between the adjacent elements. Accordingly, in the antenna module, when a plurality of radiation elements is simultaneously driven, it is possible to reduce sneak signals between power supply wirings of the respective radiation elements, and thus it is possible to suppress degradation in impedance (so-called active impedance) when the radiation elements are driven. Therefore, it is possible to broaden an antenna gain.

Note that, in design of the antenna module, when the distance D1 between the power supply elements is extended without necessarily changing the size of the dielectric substrate, a distance between an end portion of the dielectric substrate and the power supply element on each end portion in the X-axis direction in FIG. 11 (G1 in FIG. 11) may be equal to or less than ¼ of the wave length of radio waves to be radiated.

Note that, in FIG. 11, the example of the array antenna in which the power supply elements are one-dimensionally arrayed has been described, but the features of the present disclosure can also be applied to an array antenna in which the power supply elements are two-dimensionally arrayed.

Note that, in Embodiment 3, the power supply elements on both end portions of the array antenna correspond to the "first radiation element" of the present disclosure, and the power supply elements adjacent to the power supply elements on both end portions correspond to the "second radiation element" of the present disclosure.

Embodiment 4

In Embodiment 4, a case of an antenna module having two different radiation surfaces will be described.

Figure 12:
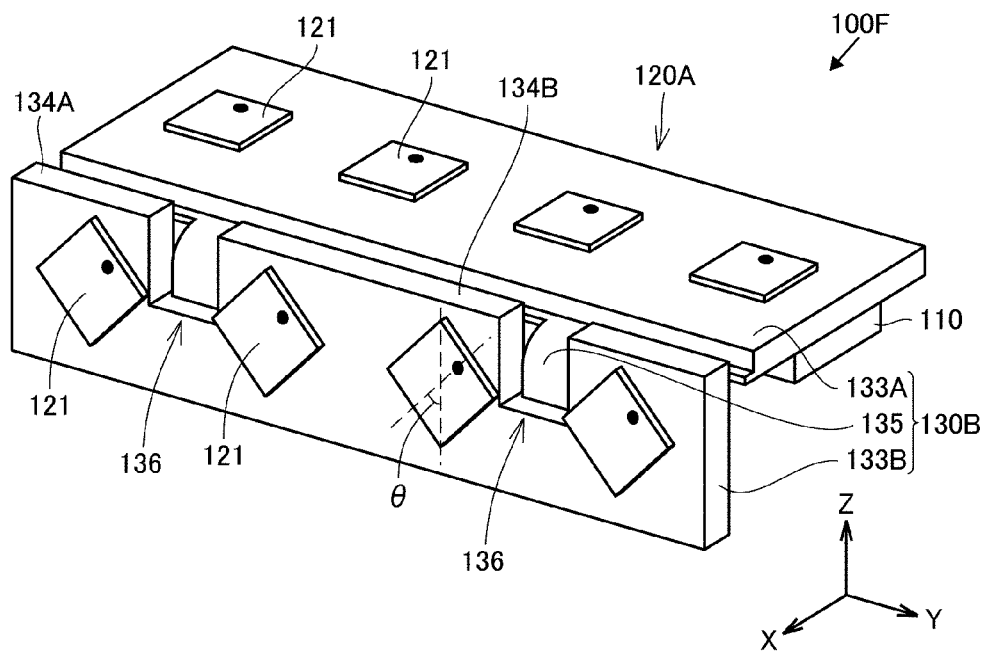
FIG. 12 is a perspective view of an antenna module according to Embodiment 4.
Figure 13:
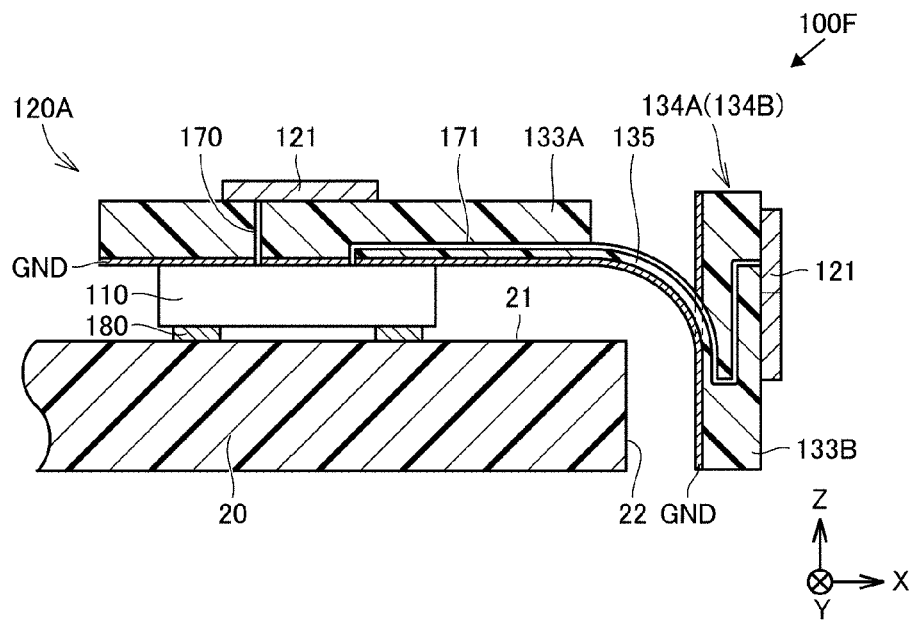
FIG. 13 is a cross-sectional perspective view of the antenna module in FIG. 12.

FIG. 12 is a perspective view of an antenna module 100F according to Embodiment 4, and FIG. 13 is a cross-sectional perspective view of a ZX plane including a bent portion of the antenna module 100F.

Referring to FIG. 12 and FIG. 13, in an antenna device 120A of the antenna module 100F, a dielectric substrate 130B has a cross-sectional shape that is a substantially L-shape, and includes a substrate 133A (second substrate) having a flat plate shape and having a normal direction in a Z-axis direction of FIG. 12 and FIG. 13, a substrate 133B (first substrate) having a flat plate shape and having a normal direction in an X-axis direction in FIG. 12 and FIG. 13, and a bent portion 135 connecting the two substrates 133A and 133B.

In the antenna module 100F, four power supply elements 121 are arranged in a row in a Y-axis direction on each of the two substrates 133A and 133B. In the following description, for ease of understanding, an example in which the power supply elements 121 are arranged so as to be exposed on surfaces of the substrates 133A and 133B will be described, but, as illustrated in FIGS. 2A and 2B of Embodiment 1, the power supply elements 121 may be arranged inside dielectric substrates of the substrates 133A and 133B.

The substrate 133A has a substantially rectangular shape, and four power supply elements 121 are arranged in a row on the surface of the substrate 133A. Further, the RFIC 110 is connected to a lower surface side (a surface in the negative direction of the Z-axis) of the substrate 133A. The RFIC 110 is mounted on a surface 21 of a mounting substrate 20 through solder bumps 180. Note that, instead of the solder connection, the RFIC 110 may be mounted on the mounting substrate 20 by using a multipolar connector.

The substrate 133B is connected to a bent portion 135 bent from the substrate 133A, and is arranged such that its inner surface (a surface in the negative direction of the X-axis) faces a side surface 22 of the mounting substrate 20. The substrate 133B has a configuration in which a plurality of cutout portions 136 is formed in the dielectric substrate having a substantially rectangular shape, and the bent portion 135 is connected to the cutout portions 136. In other words, protruding portions 134A and 134B protruding in a direction toward the substrate 133A (i.e., a positive direction of a Z-axis) along the substrate 133B from a boundary portion 134 where the bent portion 135 and the substrate 133B are connected to each other in portions where the cutout portion 136 is not formed in the substrate 133B are formed. Protruding ends of the protruding portions 134A and 134B are positioned in the positive direction of the Z-axis direction with respect to the lower surface side of the substrate 133A (a side facing the mounting substrate 20).

In the substrates 133A, 133B and the bent portion 135, the ground electrode GND is arranged on a surface facing the mounting substrate 20 or in an inner layer. A radio frequency signal from the RFIC 110 is transmitted to the power supply element 121 of the substrate 133A through the power supply wiring 170. Further, a radio frequency signal from the RFIC 110 is transmitted to the power supply element 121 of the substrate 133B through a power supply wiring 171. The power supply wiring 171 is connected to the power supply element 121 arranged on the substrate 133B through the inside of the dielectrics of the substrates 133A and 133B, and the inside (or the surface) of the dielectric of the bent portion 135, from the RFIC 110.

One power supply element 121 is arranged in each of the protruding portions 134A in the end portions of the substrate 133B. In addition, two power supply elements 121 are arranged in the protruding portion 134B in the central portion. Since the cutout portions 136 are formed in the substrate 133B, concerning the power supply elements 121 arranged on the substrate 133B, the area of the ground electrode GND coupled to each power supply element 121 is largely limited. In the example of FIG. 12, a dimension of the substrate 133B in the Z-axis direction and a dimension between the power supply element 121 and the cutout portion 136 may be particularly limited.

Therefore, in the antenna module 100F, the power supply elements 121 arranged on the substrate 133B are arranged such that the polarization directions of radio waves to be radiated from the respective power supply elements 121 are inclined with respect to each side of the ground electrode GND of the substrate 133B. That is, in each power supply element 121, the power supply element 121 is arranged such that an angle θ formed between the direction connecting the position of the end portion of the ground electrode GND having a minimum distance from the center of the power supply element 121 and the center of the power supply element 121 and the polarization direction satisfies 0°<θ<90°.

In this case, in a plan view of the substrate 133B from a normal direction, when a minimum distance between the center of the power supply element 121 and an end portion of the ground electrode GND in the polarization direction is defined as a first distance and a minimum distance between the center of the power supply element 121 and an end portion of the ground electrode GND is defined as a second distance for each power supply element 121, the first distance is longer than the second distance. Further, when a distance between an end portion of the power supply element 121 and the end portion of the ground electrode GND in the second distance is defined as a third distance, the third distance is shorter than ½ of the side length of the power supply element 121.

With such a configuration, even in a case where the cutout portion is formed in a part of the dielectric substrate (ground electrode) and the area of the ground electrode is limited, it is possible to suppress degradation in antenna characteristics.

Note that, in the antenna module 100F of FIG. 12, although the power supply elements 121 arranged on the substrate 133A are arranged such that the polarization directions thereof are parallel to the sides of the ground electrode GND in the X-axis direction, when a dimension of the substrate 133A in the X-axis direction or the Y-axis direction is limited, the power supply elements 121 may be arranged so as to be inclined in the same manner as in FIG. 11 of Embodiment 3.

Modification 4

In Modification 4, an example in which cutout portions are formed on each of the two substrates in the antenna module having the L-shape according to Embodiment 4 will be described.

Figure 14:
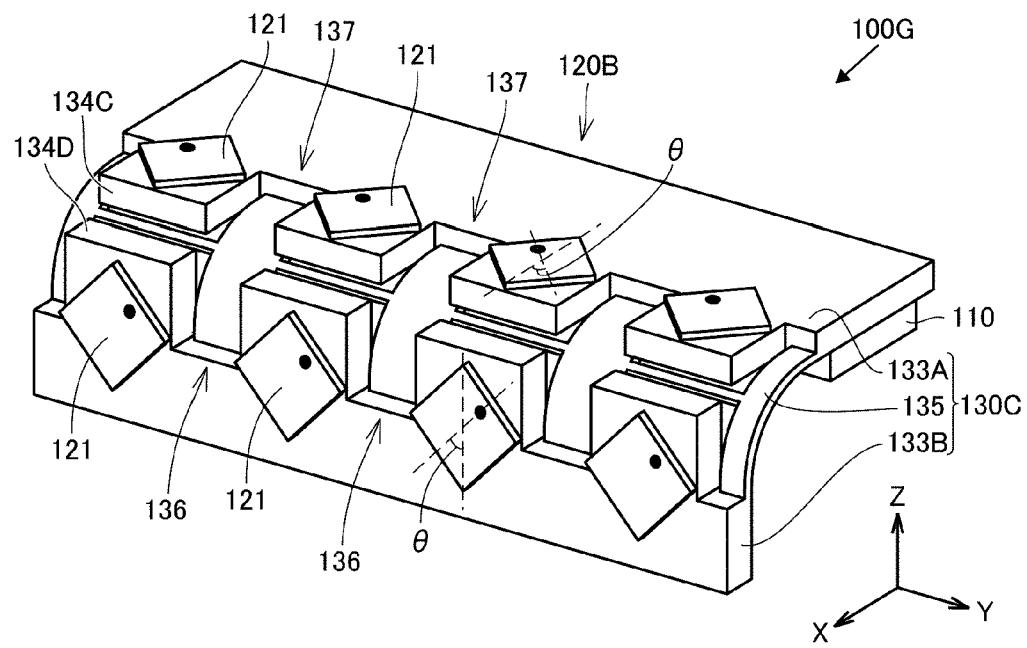
FIG. 14 is a perspective view of an antenna module according to Modification 4.

FIG. 14 is a perspective view of an antenna module 100G according to Modification 4. In an antenna device 120B of the antenna module 100G, a dielectric substrate 130C has two substrates 133A and 133B, and protruding portions 134C and 134D are formed on the substrates 133A and 133B, respectively. In the antenna device 120B, the protruding portion 134D is formed at a position corresponding to the protruding portion 134C, and the bent portion 135 is formed between cutout portions 137 of the substrate 133A and the cutout portions 136 of the substrate 133B. Additionally, the power supply element 121 is arranged at a position where at least a part of the power supply element 121 overlaps the protruding portion on each substrate.

In such a configuration, since the power supply elements 121 are individually arranged in the corresponding protruding portions, the area of the ground electrode GND to be coupled to the power supply element 121 is largely limited. Therefore, in the antenna module 100G, both of the power supply elements 121 that are arranged on the substrate 133A and the power supply elements 121 that are arranged on the substrate 133B are arranged such that the polarization directions of radio waves to be radiated from the respective power supply elements 121 are inclined with respect to each side of the ground electrode GND of the substrate.

That is, also as for each of the power supply elements 121 arranged on the substrate 133A, similarly to the power supply elements 121 on the substrate 133B, the power supply element 121 is arranged such that the angle θ formed between the direction connecting the position of the end portion of the ground electrode GND having a minimum distance from the center of the power supply element 121 and the center of the power supply element 121 and the polarization direction (second direction) satisfies 0°<θ<90°.

At this time, in a plan view of the substrate 133A from a normal direction, for each power supply element 121, when a minimum distance between the center of the power supply element 121 and an end portion of the ground electrode GND in the polarization direction is defined as a fifth distance, and a minimum distance between the center of the power supply element 121 and an end portion of the ground electrode GND is defined as a sixth distance, the fifth distance is longer than the sixth distance. Further, when a distance between an end portion of the power supply element 121 and the end portion of the ground electrode GND in the fifth distance is defined as a seventh distance, the seventh distance is shorter than ½ of the side length of the power supply element 121.

This makes it possible to enlarge a region of the ground electrode GND in the polarization direction and in the direction orthogonal to the polarization direction, and thus it is possible to suppress the degradation in antenna characteristics.

Modification 5

In Modification 5, another example of a configuration in which radio waves can be radiated in two different directions will be described.

Figure 15:
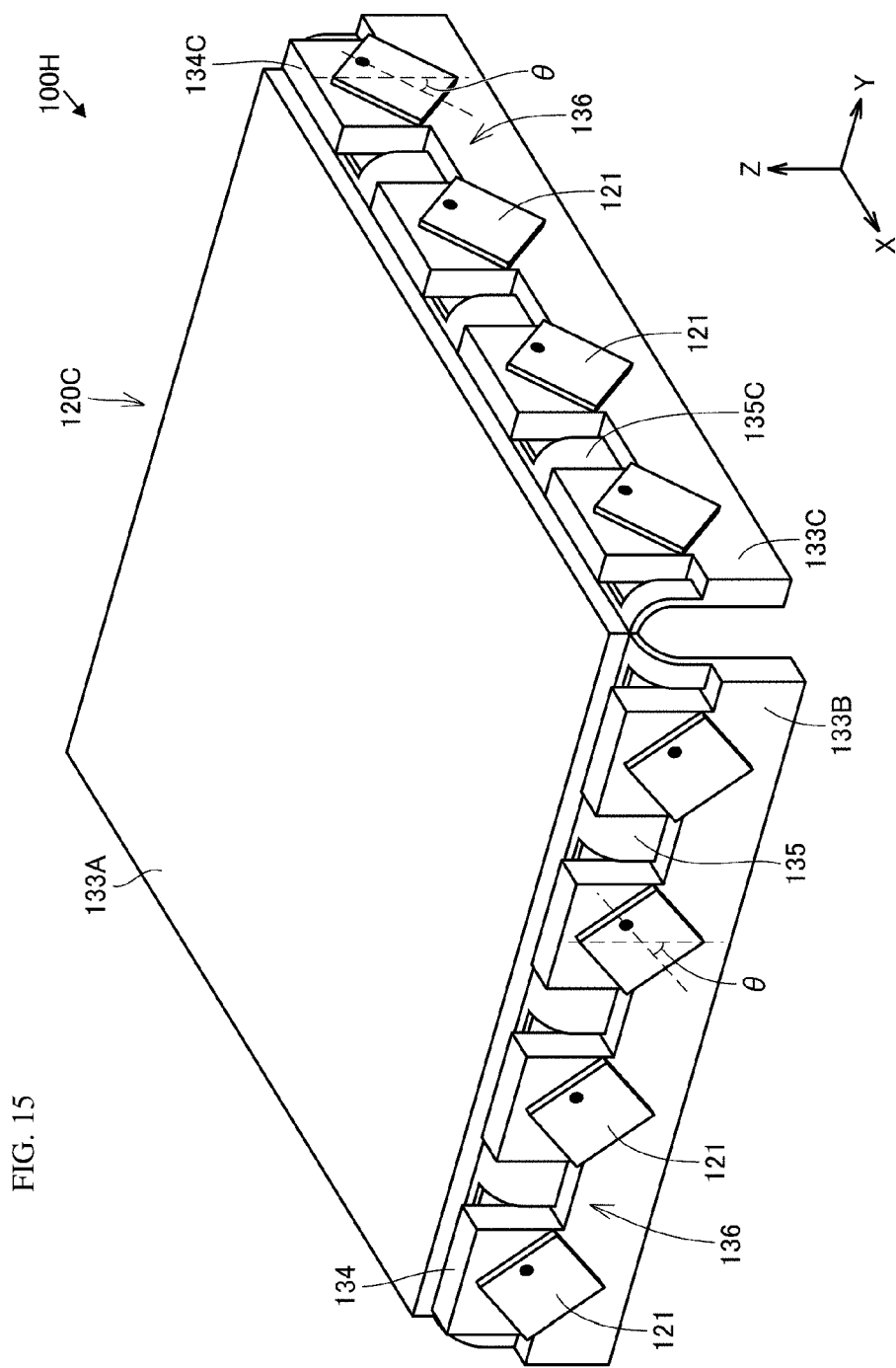
FIG. 15 is a perspective view of an antenna module according to Modification 5.

FIG. 15 is a perspective view of an antenna module 100H according to Modification 5. Referring to FIG. 15, in an antenna device 120C of the antenna module 100H, the substrate 133A in which the Z-axis direction serves as a normal direction has a substantially square flat plate shape, and a substrate 133C is also formed on a side along the Y-axis of the substrate 133A in addition to the substrate 133B formed on a side along the X-axis of the substrate 133A. The substrate 133C has a shape similar to that of the substrate 133B, and a plurality of protruding portions 134C is formed. The substrate 133C is connected to the substrate 133A by a bent portion 135C. Then, in the substrate 133C, the power supply element 121 is arranged such that at least a part of the power supply element 121 overlaps the protruding portion 134C. The antenna device 120C allows radio waves to be radiated in the X-axis direction and the Y-axis direction.

In such a configuration, also as for the power supply elements 121 that are arranged on the substrate 133C, similarly to the power supply elements 121 that are arranged on the substrate 133B, the area of the ground electrode GND to be coupled to each power supply element 121 is largely limited by the cutout portions 136. Therefore, in the antenna module 100H, the power supply elements 121 are arranged such that the polarization directions of radio waves to be radiated from the respective power supply elements 121 are inclined with respect to each side of the ground electrode GND of the substrate 133C.

That is, as for each of the power supply elements 121 that are arranged on the substrate 133C, the power supply element 121 is arranged such that the angle θ formed between the direction connecting the position of the end portion of the ground electrode GND having a minimum distance from the center of the power supply element 121 and the center of the power supply element 121 and the polarization direction (second direction) satisfies 0°<θ<90°.

In this case, in a plan view of the substrate 133C from a normal direction, for each power supply element 121, when a minimum distance between the center of the power supply element 121 and an end portion of the ground electrode GND in the polarization direction is defined as the fifth distance, and a minimum distance between the center of the power supply element 121 and an end portion of the ground electrode GND is defined as the sixth distance, the fifth distance is longer than the sixth distance. Further, when a distance between an end portion of the power supply element 121 and the end portion of the ground electrode GND in the fifth distance is defined as the seventh distance, the seventh distance is shorter than ½ of the side length of the power supply element 121.

This makes it possible to enlarge a region of the ground electrode GND in the polarization direction and in the direction orthogonal to the polarization direction, and thus it is possible to suppress the degradation in antenna characteristics.

Note that FIG. 15 illustrates an example in which the power supply elements are arranged on the substrate 133B and the substrate 133C in which the X-axis and the Y-axis serve as normal directions, respectively, and in addition, the power supply elements may be further arranged on the substrate 133A in which the Z-axis direction serves as a normal direction, and radio waves may be radiated in three directions.

Modification 6

In Modification 6, an example will be described in which, in the antenna module having the L shape according to Embodiment 4, the cutout portion is not formed in any of the two substrates.

Figure 16:
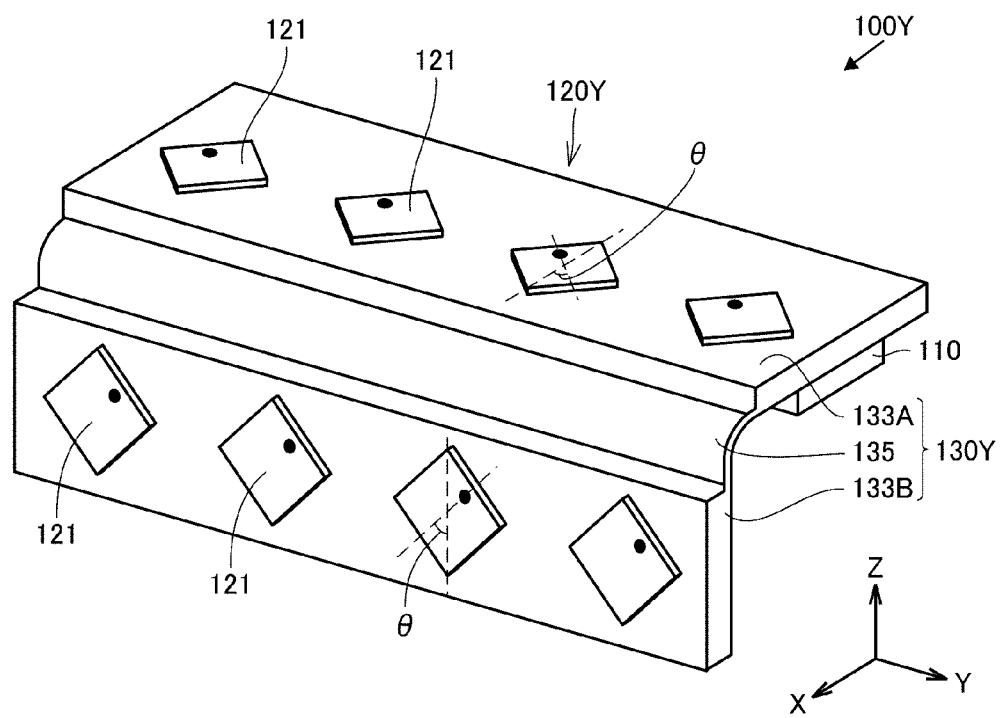
FIG. 16 is a perspective view of an antenna module according to Modification 6.

FIG. 16 is a perspective view of an antenna module 100Y according to Modification 6. In an antenna device 120Y of the antenna module 100Y, a dielectric substrate 130Y has two substrates 133A and 133B, and no cutout portion is formed in the substrates 133A and 133B. Then, the substrate 133A and the substrate 133B are connected to each other by the bent portion 135. On each of the substrates 133A and 133B, four power supply elements 121 are arranged along the Y-axis direction.

In such a configuration, when a distance between the side along the Y-axis direction of the substrate 133A and the power supply element 121 on the substrate 133A is short, and the X-axis direction serves as the polarization direction, and/or when a distance between the side along the Y-axis direction of the substrate 133B and the power supply element 121 on the substrate 133B is short, and the Z-axis direction serves as the polarization direction, the area of the ground electrode GND in the polarization direction to be coupled to each of the power supply elements 121 may be limited in some cases. Therefore, in the antenna module 100Y, both the power supply elements 121 that are arranged on the substrate 133A and the power supply elements 121 that are arranged on the substrate 133B are arranged such that the polarization directions of radio waves to be radiated from the respective power supply elements 121 are inclined with respect to the sides along the Y-axis of the respective substrates.

That is, as for both the power supply elements 121 that are arranged on the substrate 133A and the power supply elements 121 that are arranged on the substrate 133B, the power supply element 121 is arranged such that the angle θ formed between the direction connecting the position of the end portion of the ground electrode GND having a minimum distance from the center of the power supply element 121 and the center of the power supply element 121 and the polarization direction satisfies 0°<θ<90°.

By doing so, in a plan view of each of the substrates from the normal direction, when a minimum distance between the center of the power supply element 121 and an end portion of the ground electrode GND in the polarization direction is defined as the fifth distance, and a minimum distance between the center of the power supply element 121 and an end portion of the ground electrode GND is defined as the sixth distance, the fifth distance is longer than the sixth distance. Further, when a distance between an end portion of the power supply element 121 and the end portion of the ground electrode GND in the fifth distance is defined as the seventh distance, the seventh distance is shorter than ½ of the side length of the power supply element 121.

This makes it possible to enlarge a region of the ground electrode GND in the polarization direction and in the direction orthogonal to the polarization direction, and thus it is possible to suppress the degradation in antenna characteristics.

Note that, in Embodiment 4 and the modifications thereof, the power supply elements formed on the substrate 133B correspond to the "first radiation element" in the present disclosure, and the power supply elements formed on the substrate 133A or the substrate 133C correspond to the "fourth radiation element" in the present disclosure.

Embodiment 5

In Embodiment 5, a configuration capable of further radiating radio frequency signals having different frequencies in the array antenna described in Embodiment 3 will be described.

Figure 17:
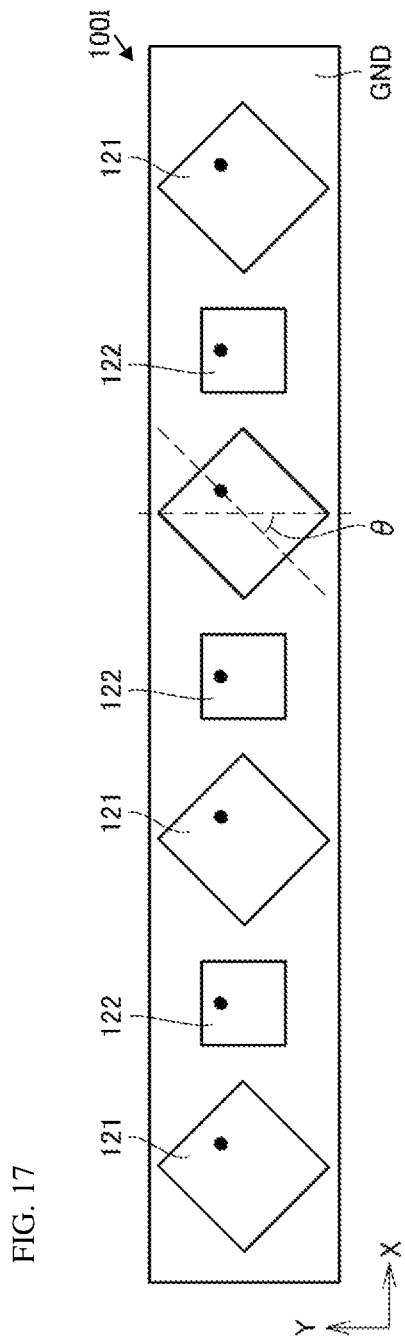
FIG. 17 is a plan perspective view of an antenna module according to Embodiment 5.

FIG. 17 is a plan perspective view of an antenna module 100I according to Embodiment 5. In the antenna module 100I, a power supply element 122 capable of radiating radio waves having a frequency different from that of radio waves to be radiated from the power supply elements 121 is arranged between two adjacent power supply elements 121. That is, the antenna module 100I is a dual-band type antenna module. Similarly to the power supply element 121, the power supply element 122 is a patch antenna having a substantially square flat plate shape.

In the example of FIG. 17, a frequency (for example, 39 GHz) of radio waves to be radiated from the power supply element 122 is higher than a frequency (for example, 28 GHz) of radio waves to be radiated from the power supply element 121. Therefore, a size of the power supply element 122 is smaller than the size of the power supply element 121.

As illustrated in FIG. 17, in a configuration in which the power supply elements capable of radiating radio waves having different frequencies are alternately arranged on a common dielectric substrate, the power supply elements 121 on a low frequency side whose sizes are larger are limited with respect to the area of the ground electrode GND. Therefore, in the antenna module 100I, it is possible to suppress degradation in antenna characteristics of the power supply element 121 by arranging the power supply element 121 to be inclined with respect to the ground electrode.

Note that the power supply elements 122 on a high frequency side whose sizes are smaller may be arranged so as to be inclined, similarly to the power supply elements 121.

Modification 7

In Embodiment 5, the case has been described in which the other radiation element that radiates radio waves having a different frequency is a patch antenna having a flat plate shape. In Modification 7, a case in which the other radiation element is a radiation element that is a different type from the patch antenna will be described.

FIG. 18 is a plan perspective view of an antenna module 100J according to Modification 7. In the antenna module 100J, a dipole antenna 123 is arranged between two adjacent power supply elements 121. In such a configuration, in a case where the power supply element 121 which is a patch antenna is limited with respect to the area of the ground electrode GND, the power supply element 121 is arranged to be inclined with respect to the ground electrode. With such a configuration, it is possible to suppress the degradation in antenna characteristics of the power supply element 121.

Note that the radiation element arranged between the two power supply elements 121 may be an antenna other than a patch antenna and a dipole antenna.

In Embodiment 5, the "power supply element 122" and the "dipole antenna 123" correspond to the "third radiation element" of the present disclosure.

Embodiment 6

In Embodiment 6, a case will be described in which a plurality of radiation elements are stacked-type patch antennas arranged so as to face each other in a laminating direction of the dielectric substrate.

Figure 19A:
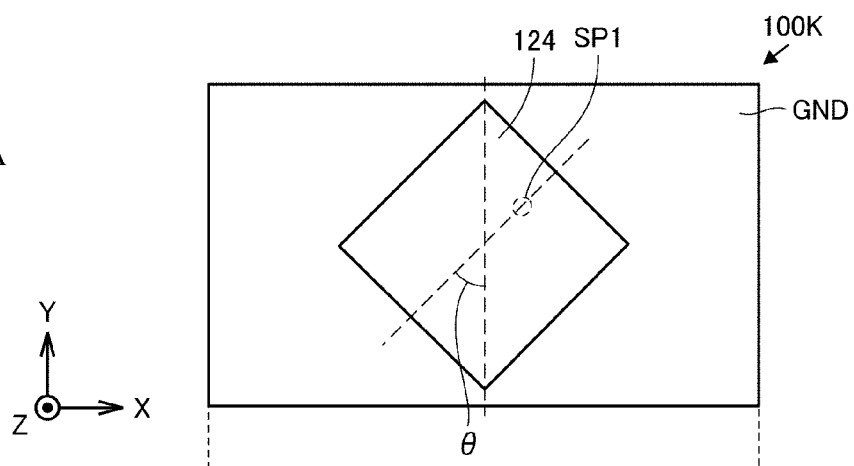
FIGS. 19A and 19B are diagrams illustrating an antenna module according to Embodiment 6.
Figure 19B:
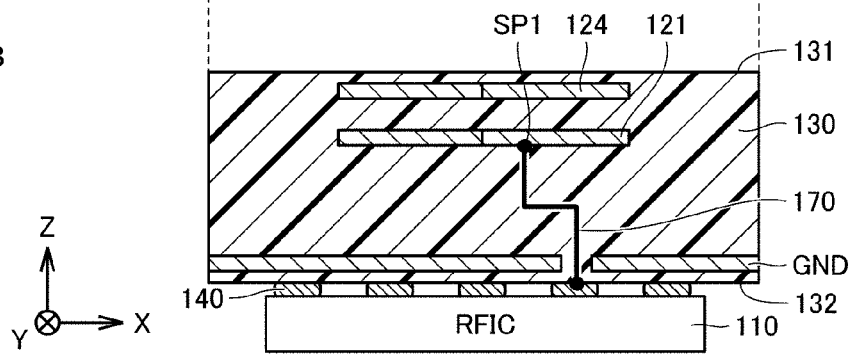

FIGS. 19A and 19B are diagrams illustrating an antenna module 100K according to Embodiment 6. In FIGS. 19A and 19B, the diagram in the upper row (FIG. 19A) is a plan perspective view of an antenna module 100K, and the diagram in the lower row (FIG. 19B) is a cross-sectional perspective view of the antenna module 100K.

Referring to FIGS. 19A and 19B, the antenna module 100K further includes, in addition to the configuration of Embodiment 1 described in FIGS. 2A and 2B, a passive element 124 arranged in a layer different from that of the power supply element 121 as a radiation element. The power supply element 121 is arranged inside the dielectric substrate 130, and the passive element 124 is arranged closer to the upper surface 131 side of the dielectric substrate 130 than the power supply element 121 so as to face the power supply element 121. Note that the passive element 124 may be arranged so as to be exposed to the upper surface 131 of the dielectric substrate 130, or may be arranged inside the dielectric substrate 130.

A size of the passive element 124 is substantially the same as the size of the power supply element 121. In addition, in a plan view of the antenna module 100K from a normal direction, the passive element 124 is arranged so as to overlap the power supply element 121. By arranging such a passive element 124, a frequency band width of the antenna module 100K can be widen.

Also, in the antenna module 100K, in a case where the area of a ground electrode GND is limited, the power supply element 121 is arranged so as to be inclined with respect to the ground electrode GND, as in the case of Embodiment 1. At this time, the passive element 124 is also arranged so as to be inclined with respect to the ground electrode GND, similarly to the power supply element 121.

With such a configuration, it is also possible to suppress degradation in antenna characteristics of the stacked-type antenna module.

Modification 8

In Modification 8, a stacked-type antenna module that is a dual-band type will be described.

Figure 20A:
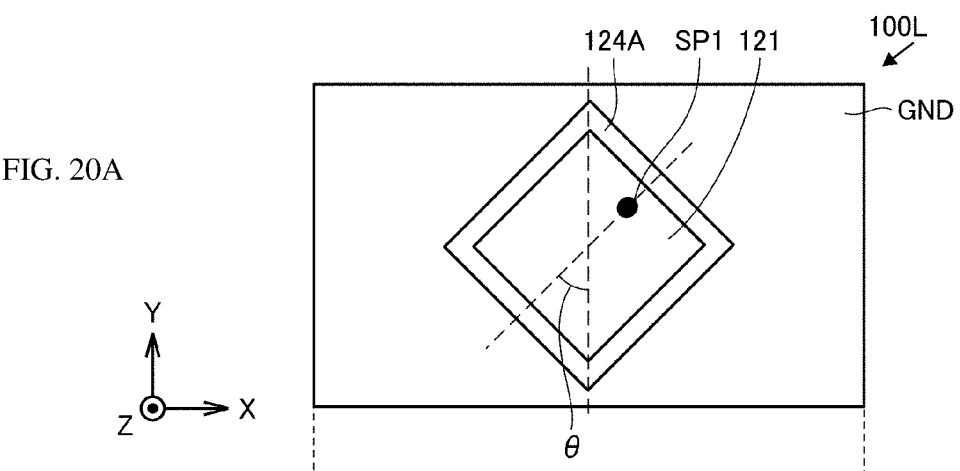
FIGS. 20A and 20B are diagrams illustrating an antenna module according to Modification 8.
Figure 20B:
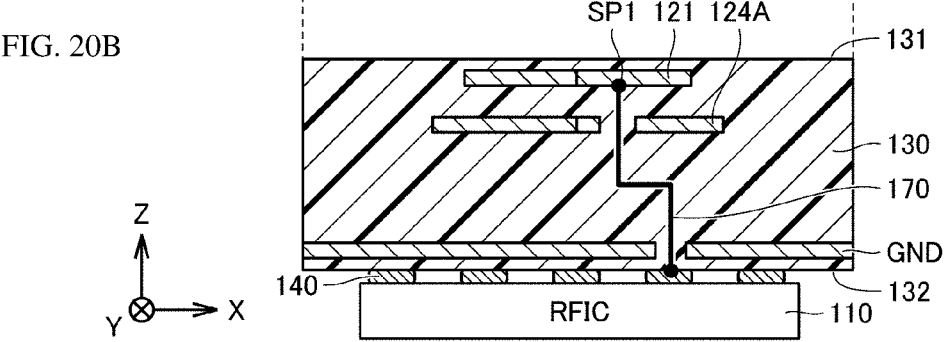

FIGS. 20A and 20B are diagrams illustrating an antenna module 100L according to Modification 8. In FIGS. 20A and 20B, the diagram in the upper row (FIG. 20A) is a plan perspective view of the antenna module 100L, and the diagram in the lower row (FIG. 20B) is a cross-sectional perspective view of the antenna module 100L.

Referring to FIGS. 20A and 20B, the antenna module 100L includes, in addition to the configuration of Embodiment 1 described in FIGS. 2A and 2B, a passive element 124A arranged in a layer different from that of the power supply element 121 as a radiation element. The passive element 124A is arranged in a layer between the power supply element 121 and the ground electrode GND so as to face the power supply element 121.

In a plan view of the antenna module 100L from a normal direction, the entire power supply element 121 is arranged so as to overlap the passive element 124A. The power supply wiring 170 penetrates the passive element 124A and is connected to the power supply element 121.

A size of the passive element 124A is larger than the size of the power supply element 121. Therefore, a resonant frequency of the passive element 124A is lower than a resonant frequency of the power supply element 121. When a radio frequency signal having a frequency corresponding to the resonant frequency of the passive element 124A is supplied from the RFIC 110 to the power supply wiring 170, the power supply wiring 170 and the passive element 124A are electromagnetically coupled to each other, and radio waves are radiated from the passive element 124A.

In such a configuration, the passive element 124A having a larger size is further limited with respect to the area of the ground electrode GND. Therefore, in the antenna module 100L, it is possible to suppress the degradation in antenna characteristics of the passive element 124A by arranging the passive element 124A to be inclined with respect to the ground electrode. Note that, in the antenna module 100L, the power supply element 121 is also arranged so as to be inclined, similarly to the passive element 124A.

Modification 9

In Modification 9, a case will be described in which, in a stacked-type antenna module, radio frequency signals are supplied to two radiation elements by using individual power supply wirings.

Figure 21A:
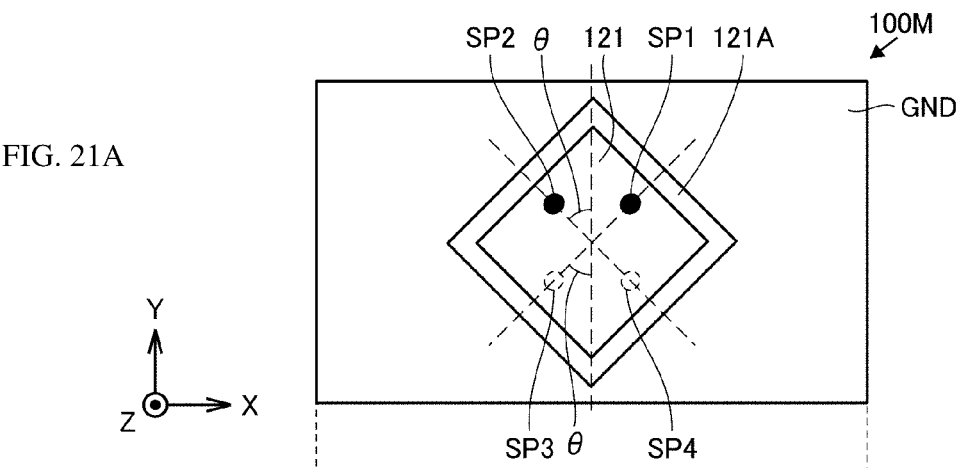
FIGS. 21A and 21B are diagrams illustrating an antenna module according to Modification 9.
Figure 21B:
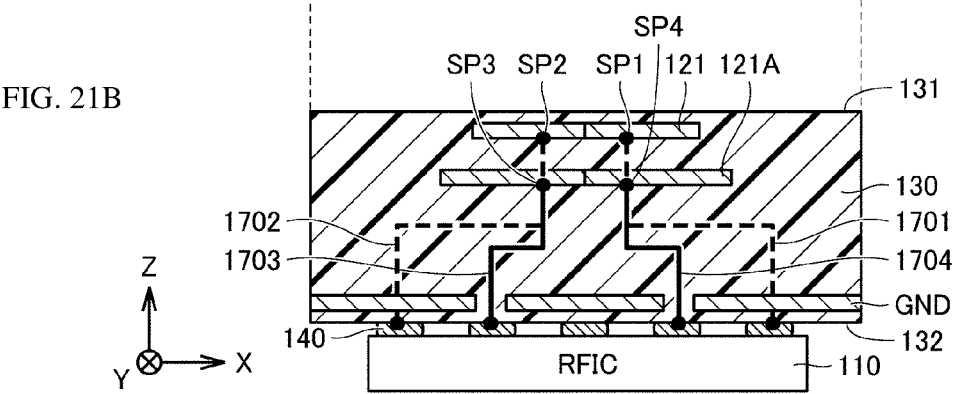

FIGS. 21A and 21B are diagrams illustrating an antenna module 100M according to Modification 9. In FIGS. 21A and 21B, the diagram in the upper row (FIG. 21A) is a plan perspective view of the antenna module 100M, and the diagram in the lower row (FIG. 21B) is a cross-sectional perspective view of the antenna module 100M.

Referring to FIGS. 21A and 21B, the antenna module 100M includes the power supply element 121 and the power supply element 121A as radiation elements. The power supply element 121A is arranged so as to face the power supply element 121 in a layer between the power supply element 121 and the ground electrode GND. In a plan view of the antenna module 100M from a normal direction, the entire power supply element 121 is arranged so as to overlap the power supply element 121A.

A size of the power supply element 121A is larger than the size of the power supply element 121. For this reason, a resonant frequency of the power supply element 121A is lower than the resonant frequency of the power supply element 121. Therefore, when a radio frequency signal is supplied to the power supply element 121A, radio waves having a frequency lower than the frequency of radio waves to be radiated from the power supply element 121 are radiated from the power supply element 121A. Additionally, in the example of FIGS. 21A and 21B, two power supply points are provided for each of the power supply element 121 and the power supply element 121A. That is, the antenna module 100M is a dual-band type and dual-polarization type antenna module.

In the power supply element 121, a radio frequency signal is supplied to the power supply point SP1 through a power supply wiring 1701, and a radio frequency signal is supplied to the power supply point SP2 through a power supply wiring 1702. The power supply wiring 1701 and the power supply wiring 1702 penetrate the power supply element 121A from the RFIC 110, and are connected to the power supply element 121. Further, in the power supply element 121A, a radio frequency signal is supplied to a power supply point SP3 through a power supply wiring 1703, and a radio frequency signal is supplied to a power supply point SP4 through a power supply wiring 1704. In each of the power supply element 121 and the power supply element 121A, the power supply points are arranged such that two polarized waves are orthogonal to each other.

Moreover, in the antenna module 100M, as in Embodiment 1, the respective sides of the power supply element 121 and the power supply element 121A are arranged so as to be inclined with respect to each side of the ground electrode GND having a rectangular shape. That is, in a plan view of the antenna module 100M, as for each of the power supply elements, each power supply element is arranged such that an angle θ formed between the direction connecting the position of the end portion of the ground electrode GND having a minimum distance from the center of the power supply element and the center of the power supply element and a polarization direction satisfies 0°<θ<90°. Note that, in the example of FIGS. 21A and 21B, each power supply element is arranged so as to be inclined by 45° with respect to the ground electrode GND.

Figure 22:
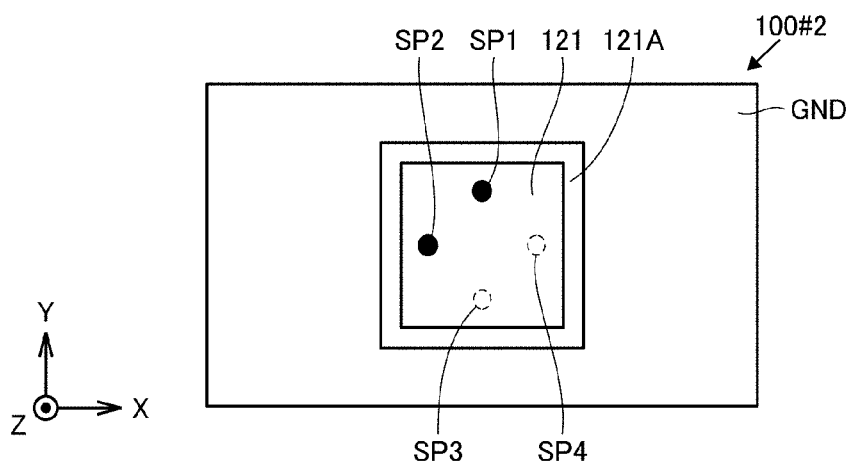
FIG. 22 is a diagram illustrating an antenna module according to a comparative example of Modification 9.

FIG. 22 is a plan perspective view of an antenna module 100 #2 according to a comparative example of Modification 9. In the antenna module 100 #2, the respective sides of the power supply elements 121 and 121A are arranged so as to be parallel to the sides of the ground electrode GND.

In the modification of FIG. 22, by supplying radio frequency signals to the power supply point SP1 and the power supply point SP3, radio waves in which a Y-axis direction serves as the polarization direction are radiated from the power supply element 121 and the power supply element 121A. Further, by supplying radio frequency signals to the power supply point SP2 and the power supply point SP4, radio waves in which an X-axis direction serves as the polarization direction are radiated from the power supply element 121 and the power supply element 121A.

In this case, as for polarized waves in the X-axis direction which is an extending direction of the long side of the ground electrode GND, a distance from each power supply element to an end portion of the ground electrode GND can be sufficiently secured in a plan view of the antenna module 100 #2, but as for polarized waves in the Y-axis direction, a distance to an end portion of the ground electrode GND is limited as compared with polarized waves in the X-axis direction. Therefore, there is a possibility that the antenna characteristics (the frequency band width and the directivity) for polarized waves in the Y-axis direction may degrade as compared with polarized waves in the X-axis direction.

On the other hand, in the antenna module 100M of FIGS. 21A and 21B, by inclining the power supply elements, a distance from the power supply element to an end portion of the ground electrode GND can be secured for each of both polarized waves that are orthogonal to each other, and therefore, it is possible to suppress extreme degradation of characteristics of one of both polarized waves.

Modification 10

In Modification 10, an example of an array antenna in which a plurality of stacked-type antenna modules is one-dimensionally arranged will be described.

Figure 23:
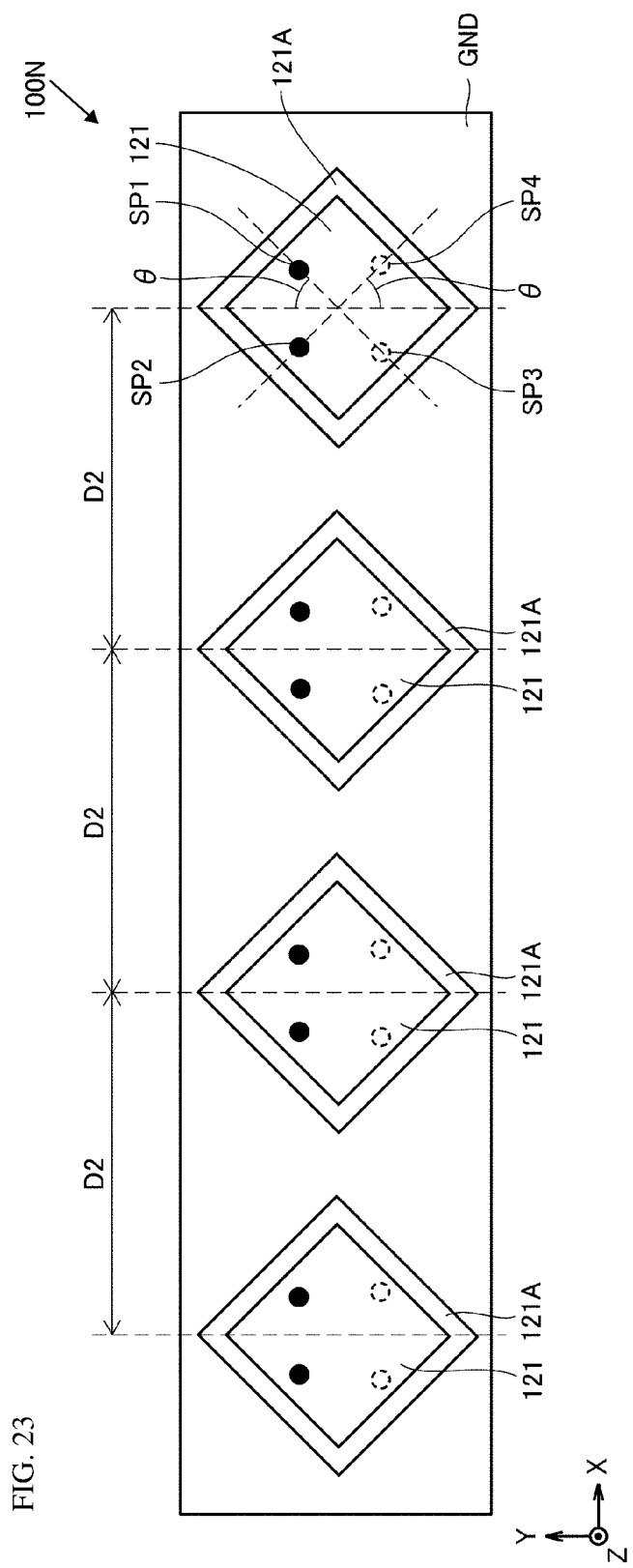
FIG. 23 is a plan perspective view of an antenna module according to Modification 10.

FIG. 23 is a plan perspective view of an antenna module 100N according to Modification 10. The antenna module 100N has a configuration in which four radiation elements (the power supply elements 121 and 121A) in the antenna module 100M described in Modification 9 are arranged along the X-axis direction. Adjacent radiation elements are arranged with a distance D2 therebetween. In the antenna module 100N, it is suitable that the distance D2 be set to be wider than ½ of the wave length of radio waves on the low frequency side that are radiated from the power supply element 121A.

With such a configuration, isolation between the adjacent radiation elements can be enhanced as similar to the description in FIG. 11. This makes it possible to suppress the degradation in active impedance in the antenna module, and as a result, it is possible to widen an antenna gain. Note that, in the antenna module 100N, the example of the dual-polarization type antenna module in which each power supply element can radiate radio waves in two polarization directions has been described, but the antenna module may have a configuration in which each power supply element radiates radio waves only in one polarization direction.

It should be considered that the embodiments disclosed herein are illustrative in all respects and are not restrictive. The scope of the present disclosure is indicated by the claims rather than the description of the above-described embodiments, and it is intended to include all modifications within the meaning and scope equivalent to the claims.

REFERENCE SIGNS LIST

10 COMMUNICATION DEVICE
20 MOUNTING SUBSTRATE
100, 100A TO 100N, 100Y, 100 #, 100 #1, 100 #2 ANTENNA MODULE
110 RFID
111A TO 111D, 113A TO 113D, 117 SWITCH
112AR TO 112DR LOW-NOISE AMPLIFIER
112AT TO 112DT POWER AMPLIFIER
114A, 114D ATTENUATOR
115A, 115D PHASE SHIFTER
116 SIGNAL MULTIPLEXER/DEMULTIPLEXER
118 MIXER
119 AMPLIFICATION CIRCUIT
120, 120A TO 120C, 120Y ANTENNA DEVICE
121, 121A, 121 #, 122, 122 #POWER SUPPLY ELEMENT
123 DIPOLE ANTENNA 124, 124A PASSIVE ELEMENT
125 PARASITIC ELEMENT
130, 130B, 130C, 130Y DIELECTRIC SUBSTRATE
133A TO 133C SUBSTRATE
134 BOUNDARY PORTION
134A TO 134D PROTRUDING PORTION
135, 135C BENT PORTION
136, 137 CUTOUT PORTION
140, 180 SOLDER BUMP
170, 171, 1701 TO 1704 POWER SUPPLY WIRING
200 BBIC
GND GROUND ELECTRODE
SP1 TO SP4 POWER SUPPLY POINT

The invention claimed is:

1. An antenna module comprising:
a first radiation element having a flat plate shape and being configured to radiate a radio wave with a first direction as a polarization direction; and
a first ground electrode arranged so as to face the first radiation element, wherein:
a minimum distance along the first direction between a center of the first radiation element and an end portion of the first ground electrode is a first distance,
a minimum distance between the center of the first radiation element and an end portion of the first ground electrode is a second distance,
a distance between the end portion of the first ground electrode and an end portion of the first radiation element in a direction of the second distance is a third distance,
as seen in a plan view of the antenna module from a normal direction of the first radiation element, the first distance is longer than the second distance, and the third distance is shorter than ½ of a size of the first radiation element,
the first ground electrode has a rectangular shape having a long side and a short side, and a distance from the center of the first radiation element to the short side is longer than a distance from the center of the first radiation element to the long side, and
the third distance is shorter than twice a distance in a laminating direction between the first radiation element and the first ground electrode.

2. The antenna module according to claim 1, wherein a wave length of a radio wave radiated from the first radiation element is λ, and the third distance is shorter than λ/4.

3. The antenna module according to claim 1, wherein:
the first radiation element comprises a power supply circuit element and a passive circuit element that are arranged so as to face each other at different heights from each other from the first ground electrode, and
as seen in the plan view of the antenna module from the normal direction, the power supply circuit element and the passive circuit element overlap with each other.

4. The antenna module according to claim 3, further comprising:
a power supply wiring configured to supply a radio frequency signal to the power supply circuit element, wherein:
the passive circuit element is arranged between the power supply circuit element and the first ground electrode, and
the power supply wiring penetrates the passive circuit element and is connected to the power supply circuit element.

5. The antenna module according to claim 1, wherein:
the first radiation element comprises a first power supply circuit element and a second power supply circuit element that are arranged so as to face each other at different heights from the first ground electrode, and
as seen in the plan view of the antenna module from the normal direction, the first power supply circuit element and the second power supply circuit element overlap with each other.

6. The antenna module according to claim 1, wherein:
the first radiation element comprises a power supply circuit element and at least one parasitic circuit element arranged around the power supply circuit element, and
the size of the first radiation element is equal to one side length of an outer edge of a region including the power supply circuit element and the at least one parasitic circuit element as seen in the plan view of the antenna module from the normal direction.

7. The antenna module according to claim 1, wherein:
the first radiation element is further configured to radiate a radio wave whose polarization direction is a second direction, the second direction being different from the first direction, and
a minimum distance along the second direction between the center of the first radiation element and an end portion of the first ground electrode is a fourth distance, and the fourth distance is longer than the second distance.

8. The antenna module according to claim 1, further comprising:
a second radiation element that has a flat plat shape and that is arranged so as to face the first ground electrode, wherein the second radiation element is configured to radiate a radio wave whose polarization direction is the first direction.

9. The antenna module according to claim 8, further comprising:
a third radiation element arranged between the first radiation element and the second radiation element,
wherein the third radiation element is configured to radiate a radio wave having a frequency different from frequencies of radio waves radiated from the first radiation element and from the second radiation element.

10. The antenna module according to claim 1, further comprising:
a fourth radiation element having a flat plate shape; and
a second ground electrode arranged so as to face the fourth radiation element,
wherein a normal direction of the fourth radiation element is different from the normal direction of the first radiation element.

11. The antenna module according to claim 10, wherein:
the fourth radiation element is configured to radiate a radio wave whose polarization direction is a second direction,
a minimum distance along the second direction between a center of the fourth radiation element and an end portion of the second ground electrode is a fifth distance,
a minimum distance between the center of the fourth radiation element and an end portion of the second ground electrode is a sixth distance,
a minimum distance between the end portion of the second ground electrode and an end portion of the fourth radiation element in a direction of the sixth distance is a seventh distance, and as seen in the plan view from the normal direction of the fourth radiation element, the fifth distance is longer than the sixth distance, and the seventh distance is shorter than ½ of a size of the fourth radiation element.

12. The antenna module according to claim 1, further comprising:
a power supply circuit configured to supply a radio frequency signal to the first radiation element.

13. A communication device comprising:
the antenna module according to claim 1.

14. An antenna module comprising:
a plurality of first radiation elements arranged side by side in an arrangement direction, each of the first radiation elements having a flat plate shape and being configured to radiate a radio wave with a first direction as a polarization direction; and
a first ground electrode arranged so as to face each of the plurality of first radiation elements, wherein:
a minimum distance along the first direction between a center of one of the first radiation elements and an end portion of the first ground electrode is a first distance,
a minimum distance between the center of the one of the first radiation elements and an end portion of the first ground electrode is a second distance,
a distance between the end portion of the first ground electrode and an end portion of the one of the first radiation elements in a direction of the second distance is a third distance,
as seen in a plan view of the antenna module from a normal direction of the one of the first radiation elements, the first distance is longer than the second distance, and the third distance is shorter than ½ of a size of the first radiation element,
for each of the plurality of first radiation elements, a distance from the center of the first radiation element to an end portion of the first ground electrode in the arrangement direction is different than a distance from the center of the first radiation element to an end portion of the first ground electrode in the direction orthogonal to the arrangement direction, and
the third distance is shorter than twice a distance in a laminating direction between the first radiation element and the first ground electrode.

* * * * *